United States Patent
Miyake et al.

[11] Patent Number: 6,100,305
[45] Date of Patent: Aug. 8, 2000

[54] METHOD OF PRODUCTION OF WATER-ABSORBING RESIN

[75] Inventors: Koji Miyake; Yoshihiro Motono, both of Himeji; Nobuyuki Harada, Suita; Akito Yano, Himeji; Teruyuki Kanto, Himeji; Shigeru Sakamoto, Himeji, all of Japan

[73] Assignee: Nippon Shokubai Co., Ltd., Osaka, Japan

[21] Appl. No.: 09/091,462

[22] PCT Filed: Oct. 16, 1997

[86] PCT No.: PCT/JP97/03753

§ 371 Date: Jun. 18, 1998

§ 102(e) Date: Jun. 18, 1998

[87] PCT Pub. No.: WO98/17453

PCT Pub. Date: Apr. 30, 1998

[30] Foreign Application Priority Data

| Oct. 24, 1996 | [JP] | Japan | 8-301115 |
| Oct. 24, 1996 | [JP] | Japan | 8-301116 |
| Jul. 25, 1997 | [JP] | Japan | 9-199460 |
| Jul. 25, 1997 | [JP] | Japan | 9-199461 |

[51] Int. Cl.[7] .................................................. C08J 9/36
[52] U.S. Cl. .................... 521/53; 521/54; 521/64; 521/149; 264/140; 264/165
[58] Field of Search .................. 521/53, 54, 64, 521/149; 264/140, 165

[56] References Cited

U.S. PATENT DOCUMENTS

| 3,720,534 | 3/1973 | Macaulay et al. .................... 428/321.3 |
| 4,690,788 | 9/1987 | Yada et al. . | |
| 5,118,719 | 6/1992 | Lind . | |
| 5,314,420 | 5/1994 | Smith et al. . | |
| 5,328,935 | 7/1994 | Van Phan et al. . | |
| 5,338,766 | 8/1994 | Phan et al. . | |
| 5,451,613 | 9/1995 | Smith et al. ................................ 521/53 |
| 5,712,316 | 1/1998 | Dahmen et al. . | |
| 5,859,077 | 1/1999 | Reichman et al. ....................... 521/149 |

FOREIGN PATENT DOCUMENTS

| 61-110510 | 5/1986 | Japan . |
| 3-2042 | 1/1991 | Japan . |
| 4-317739 | 11/1992 | Japan . |
| 7-185331 | 7/1995 | Japan . |
| WO 89/03865 | 5/1989 | WIPO . |

*Primary Examiner*—John Cooney
*Attorney, Agent, or Firm*—Nixon & Vanderhye P.C.

[57] ABSTRACT

A water-absorbent resin is produced by crushing a mass of crosslinked hydrogel polymer having high adhesion and elastic properties without kneading it, and drying the crushed crosslinked hydrogel polymer. In the case when the crosslinked hydrogel polymer includes cells therein, the crosslinked hydrogel polymer is crushed so as to restrain reduction in the number of cells contained in the crosslinked hydrogel polymer. The crosslinked hydrogel polymer is crushed by any of crushing methods including: shearing the crosslinked hydrogel polymer with a fixed blade and a rotary blade; cutting the crosslinked hydrogel polymer with a cutter having a pair of rotary blades that are mounted on different shafts and rotate while at least partly overlapping each other; cutting the crosslinked hydrogel polymer with a cutter having a rotary blade using a lubricant; and crushing the crosslinked hydrogel polymer after freezing. With the use of the above methods, it is possible to industrially and easily mass-produce porous water-absorbent resins with excellent absorption properties while restraining reduction in the number of cells contained in the crosslinked hydrogel polymer.

25 Claims, 14 Drawing Sheets

METHOD OF PRODUCTION OF WATER-ABSORBING RESIN

TECHNICAL FIELD

The present invention relates to a process for producing water-absorbent resins suitable for use in various applications, for example, sanitary materials (such as paper diapers and incontinence pads), water retentive material for soil, freshness retentive materials for food, and water retentive materials for agricultural and horticultural use, by crushing a mass of crosslinked hydrogel polymer of high adhesion properties and elastic properties, without kneading it.

BACKGROUND OF THE INVENTION

It is well known that a crosslinked hydrogel polymer as a water-absorbent crosslinked polymer is obtained by aqueous solution polymerization of a water-soluble ethylenically unsaturated monomer under the presence of a small amount of crosslinking agent. The crosslinked hydrogel polymer is a highly elastic semisolid gel material, and is rarely used as it is. In many cases, in order to increase the drying efficiency, the crosslinked hydrogel polymer is once crushed (granulated), and then dried and ground. Namely, the crosslinked hydrogel polymer in the form of dried powder is used as an water-absorbent resin, i.e., water-absorber.

As a method of crushing a mass of the crosslinked hydrogel polymer in the above-mentioned process, for example, it is possible to use known methods, for example, 1̂ crushing the crosslinked hydrogel polymer after polymerization by a screw-type extruder such as a meat chopper, 2̂ crushing the crosslinked hydrogel polymer during polymerization in the kneader, 3̂ chopping the crosslinked hydrogel polymer after polymerization with hands using scissors, and 4̂ cutting the crosslinked hydrogel polymer while pressing a ring-shaped cutting edge against a counter roll.

However, when crushing the crosslinked hydrogel polymer obtained by aqueous solution polymerization using a meat chopper or kneader, the crosslinked hydrogel polymer is crushed while being compressed and kneaded. Therefore, when the above-method 1̂ or 2̂ is adopted, a very strong mechanical external force acts on the crosslinked hydrogel polymer. Consequently, there is a possibility that the crosslinked polymer chain is cut, and the water-soluble component content increases.

In resent years, in order to prevent clothes, etc. from being made dirty by body exudates such as urine and blood, particulate water-absorbent resins for absorbing and holding such body exudates are widely used as a component member of sanitary materials such as paper diapers, sanitary napkins, and incontinence pads. Moreover, there has been a recent trend toward decreasing the fiber base material such as pulp and increasing the water-absorbent resin content of the sanitary materials in order to decrease the thickness and improve the performance of the sanitary materials. Thus, there is demand for a further improvement of the absorption properties of the water-absorbent resin. Such demand can be satisfied by improving the absorption properties, more particularly water absorbing capacity and absorption rate. For example, according to a known method for improving the absorption properties, the surface area of the water-absorbent resin is increased. However, if the surface area is increased by simply decreasing the particle diameter of the particulate water-absorbent resin, the liquid permeability in the water-absorbent resin is worsened.

As a method for increasing the surface area without decreasing the particle diameter, for example, Japanese publication of unexamined patent application (Tokukaihei) Nos. 5-237378 and 7-185331, and publication of international application No. WO95/02002 proposed a method for producing a water-absorbent resin in the form of porous particles by causing the particles of the water-absorbent resins to contain cells therein using a blowing agent during polymerization or crosslinking.

Thus, in a suitable method for improving the absorption properties of a water-absorbent resin, a crosslinked hydrogel polymer is formed by aqueous solution polymerization of, for example, a water-soluble ethylenically unsaturated monomer under the presence of a crosslinking agent so that the crosslinked hydrogel polymer includes cells therein, crushed, dried, and then ground. However, particularly, when the crosslinked hydrogel polymer is formed by aqueous solution polymerization of a water-soluble ethylenically unsaturated monomer under the presence of a crosslinking agent so that the crosslinked hydrogel polymer includes cells therein, if the crosslinked hydrogel polymer is crushed by a meat chopper or kneader, the cells in the crosslinked hydrogel polymer are squashed. As a result, the crushed crosslinked hydrogel polymer has a reduced number of cells. In the resultant water-absorbent resin, the liquid guide space that is necessary for the movement of an aqueous liquid cannot be sufficiently ensured because the surface area is decreased by the reduction in the number of cells. Thus, there is a possibility that the permeability and dispersibility of the aqueous liquid are lowered. Hence, a water-absorbent resin produced by the above-mentioned process suffers from problems that the absorption properties such as absorption rate and water absorbing capacity are lowered as well as an increase in the water-soluble component content.

On the other hand, when the above-mentioned method 3̂ is adopted, it is possible to avoid squashing of the cells in the crosslinked hydrogel polymer during chopping. However, with this method, the productivity is low, and therefore industrial production of water-absorbent resins is almost impossible. Moreover, with this method, since the crosslinked hydrogel polymer has relatively strong adhesion properties, it adheres to the cutting blades of scissors, and therefore the quality of the blades is degraded with time.

Meanwhile, with the above-mentioned method 4̂, the highly elastic crosslinked hydrogel polymer is deformed when it is pressed against the counter roll, and the crosslinked hydrogel polymer winds itself around the ring-shaped cut edge. Consequently, the crosslinked hydrogel polymer cannot be cut into a desired size, and the operation cannot be performed continuously.

Another method for granulating a mass of crosslinked hydrogel polymer is disclosed in Japanese publication of examined patent application (Tokukohei) No. 3-2042 corresponding to U.S. Pat. No. 4,690,788. In this method, the water-soluble polymer gel is crushed by chewing and cutting it between two rotating roller-type cutters.

However, this crushing method also does not consider polymer gels having cells. When this crushing method is used, in order to crush the polymer gel, first, the polymer gel is chewed between the two roller-type cutters, and cut. After crushing, the polymer gel is extruded through a die. Hence, if the crushed polymer gel contains cells, the cells are squashed in the above-mentioned step, and the number of cells is significantly reduced. Accordingly, the water-absorbent resin produced by this method has a considerably reduced number of cells and a small surface area. Namely, this water-absorbent resin has deteriorated absorption properties. In the above-mentioned situation, there is demand for a process of producing an industrially producible water-absorbent resin with excellent absorption properties.

DISCLOSURE OF THE INVENTION

It is an object of the present invention to provide a process for producing industrially producible water-absorbent resin with excellent absorption properties. It is another object of the present invention to provide a process for producing porous water-absorbent resins containing as many as possible cells therein so as to provide water-absorbent resins with excellent absorption properties.

In order to achieve the above objects, the present inventors studied and discovered an industrially practicable method of crushing a crosslinked hydrogel polymer as a precursor of the above water-absorbent resin, without kneading. Moreover, it was discovered that, with the use of the method discovered by the present inventors, it is possible to crush the crosslinked hydrogel polymer while restraining reduction in the number of cells contained in the crosslinked hydrogel polymer.

Namely, the present invention is a process for producing a water-absorbent resin by crushing and drying a crosslinked hydrogel polymer having cells, characterized by crushing the crosslinked hydrogel polymer so that reduction in the number of cells contained in the polymer is restrained.

More specifically, the above crushing method includes: a method of crushing the crosslinked hydrogel polymer by shearing it with a fixed blade and a rotary blade; a method of crushing the crosslinked hydrogel polymer by cutting it with a cutter having a pair of rotary blades that are mounted on different shafts and rotate while at least partly overlapping each other; a method of crushing the crosslinked hydrogel polymer by cutting it with a cutter having a rotary blade using a lubricant; and a method of crushing the crosslinked hydrogel polymer after freezing it.

According to the above methods discovered by the inventors, it is possible to stably produce a porous water-absorbent resin by crushing a crosslinked hydrogel polymer having cells therein while restraining the reduction in the number of the cells. With the present invention, therefore, it is possible to obtain water-absorbent resins with excellent absorption properties such as water absorbing capacity and absorption rate under no pressure, and water absorbing capacity under applied pressure.

Additionally, according to the above methods discovered by the inventors, the external mechanical force during crushing of the crosslinked hydrogel polymer is reduced. Thus, with these methods, the crosslinked hydrogel polymer is not kneaded, thereby restraining the water-soluble component content from being increased. Besides, all of the above methods permit continuous industrial production of water-absorbent resins.

Namely, the present invention is a process for producing a water-absorbent resin by grinding and drying a crosslinked hydrogel polymer having cells, characterized by crushing the crosslinked hydrogel polymer by shearing it with a rotary blade and a fixed blade mounted to face the rotary blade.

Additionally, the present invention is a process for producing a water-absorbent resin by grinding and drying a crosslinked hydrogel polymer, characterized by crushing the crosslinked hydrogel polymer by cutting it with a cutter having a pair of rotary blades that are mounted on different shafts and rotate while at least partly overlapping each other.

Furthermore, the present invention is a process for producing a water-absorbent resin by grinding and drying a crosslinked hydrogel polymer, characterized by crushing the crosslinked hydrogel polymer by cutting it with a cutter having a rotary blade using a lubricant.

Besides, the present invention is a process for producing a water-absorbent resin by grinding and drying a crosslinked hydrogel polymer, characterized by crushing the crosslinked hydrogel polymer after freezing it.

As a technique for freezing and then crushing the crosslinked hydrogel polymer, a process for producing synthetic snow by forming a hydrogel by causing a water-absorbent resin to absorb water to the maximum degree, freezing the hydrogel, and then crushing the hydrogel, is known (Japanese publication of examined patent application (Tokukohei) No. 7-110937 (corresponding to the publication of international patent application No. WO89/03865)). However, according to this process, the hydrogel is formed by adding 60 or more parts by weight of water with respect to the water-absorbent resin as a final product, and then freezed. Thus, this process is a technique for stably producing ice such as synthetic snow, but not a crushing technique for use in the process for producing water-absorbent resins.

The following description will explain the present invention in detail.

The process for producing water-absorbent resins of the present invention is a process for producing a water-absorbent resin by crushing and drying a crosslinked hydrogel polymer, and a process for producing a water-absorbent resin with excellent absorption properties by crushing the crosslinked hydrogel polymer without kneading.

According to the present invention, the crosslinked hydrogel polymer can be easily obtained by polymerizing a monomer component containing an ethylenically unsaturated monomer, under the presence of a crosslinking agent. The ethylenically unsaturated monomer used as a starting material of the crosslinked hydrogel polymer is a water-soluble monomer. More specifically, examples of the ethylenically unsaturated monomer include:

monomers containing acid groups, such as (meth)acrylic acid, β-acryloyloxypropionic acid, maleic acid, maleic anhydride, fumaric acid, crotonic acid, itaconic acid, cinnamic acid, sorbic acid, 2-(meth)acryloylethane sulfonic acid, 2-(meth)acryloylpropanesulfonic acid, 2-(meth)acrylamido-2-methylpropanesulfonic acid, vinylsulfonic acid, styrenesulfonic acid, allylsulfonic acid, vinylphosphonic acid, 2-(meth) acryloyloxyethyl phosphate and (meth)acryloxyalkanesulphonic acid, and alkaline metal salts and alkaline earth metal salts, ammonium salts, and alkyl amine salts thereof;

dialkylaminoalkyl(meth)acrylates, such as N,N-dimethylaminoethyl(meth) acryalte, N,N-dimethylaminopropyl(meth)acrylate and N,N-dimethylaminopropyl(meth)acrylamide, and quaternary compounds thereof (for example, a reaction product produced with alkylhalide, and a reaction product produced with dialkyl sulfate);

dialkylaminohydroxyalkyl(meth)acrylates, and quaternary compounds thereof;

N-alkylvinylpyridinium halide;

hydroxyalkyl (meth)acrylates, such as hydroxymethyl (meth)acrylate, 2-hydroxyethyl (meth)acrylate, and 2-hydroxypropyl (meth)acrylate;

acrylamide, methacrylamide, N-ethyl (meth)acrylamide, N-n-propyl(meth)acrylamide, N-isopropyl(meth) acrylamide, N,N-dimethyl (meth)acrylamide;

alkoxypolyethylene glycol (meth)acrylate and polyethylene glycol mono(meth)acrylate, such as 2-hydroxyethyl (meth)acrylate, 2-hydroxypropyl (meth)acrylate and methoxypolyethylene glycol (meth)acrylate;

vinylpyridine, N-vinylpyridine, N-vinylpyrrolidone, and N-acryloyl piperidine;

N-vinylacetamide;

vinyl acetate; and alkyl (meth)acrylates, such as methyl (meth)acrylate, and ethyl (meth)acrylate. These monomers may be used individually, or in combination of two or more kinds thereof.

Among the above-exemplified ethylenically unsaturated monomers, monomers containing an acrylic acid salt monomer as a chief constituent is preferred because the resulting crosslinked hydrogel polymer has further improved absorption and safety characteristics. Here, the acrylic acid salt monomer means acrylic acid and/or water-soluble salts of acrylic acid. The water-soluble salts of acrylic acid are alkaline metal salts, alkaline earth metal salts, ammonium salts, hydroxy ammonium salts, amine salts and alkyl amine salts of acrylic acid having a neutralization ratio within the range of from 30 mole percent to 100 mole percent, and more preferably from 50 mole percent to 99 mole percent. Among the exemplified water-soluble salts, sodium salt and potassium salt are more preferred. These acrylic acid salt monomers may be used individually or in combination of two or more kinds thereof. The average molecular weight (degree of polymerization) of the water-absorbent resin is not particularly restricted.

The monomer component may contain other monomers (copolymerizable monomers) copolymerizable with the ethylenically unsaturated monomer to such a degree that the hydrophilic nature of the resultant crosslinked hydrogel polymer is not substantially interfered. More specifically, examples of the copolymerizable monomer include: (meth)acrylates such as methyl (meth)acrylate, ethyl (meth)acrylate, and butyl (meth)acrylate; and hydrophobic monomers such as vinyl acetate, vinyl propionate. These copolymerizable monomers can be used individually or in combination of two or more kinds thereof.

As the cross-linking agent used for polymerizing the monomer component, it is possible to use, for example, compounds having a plurality of vinyl groups in a molecule, and compounds having a plurality of functional groups reactive with a carboxyl group or sulfonic group in a molecule. These crosslinking agents may be used individually, or in combination of two or more kinds thereof.

More specifically, examples of the compounds having a plurality of vinyl groups in a molecule are N,N'-methylene bis(meth)acrylamide, (poly)ethylene glycol di(meth)acrylate, (poly)propylene glycol di(meth)acrylate, trimethylolpropane tri(meth)acrylate, trimethylolpropane di(meth)acrylate, glycerine tri(meth)acrylate, glycerine acrylate methacrylate, ethylene oxide denaturated trimethylolpropane tri(meth) acrylate, pentaerythritol tetra(meth)acrylate, dipentaerythritol hexa(meth)acrylate, N,N-diallylacrylamide, triallyl cyanurate, triallyl isocyanurate, triallyl phosphate, triallylamine, diallyloxy acetic acid, N-methyl-N-vinylacrylamide, bis(N-vinylcarboxyamide), and poly(meth) allyloxyalkanes such as tetraallyloxyethane.

Examples of the compound having a plurality of functional groups reactive with the carboxylic group or sulfonic group in a molecule, include:

polyhydric alcohol compounds, such as (poly)ethylene glycol, diethylene glycol, propylene glycol, triethylene glycol, tetraethylene glycol, propylene glycol, 1,3-propanediol, dipropylene glycol, 2,2,4-trimethyl-1,3-pentanediol, polypropylene glycol, (poly)grycerine, 2-butene-1,4-diol, 1,4-butanediol, 1,5-pentanediol, 1,6-hexanediol, 1,2-cyclohexane-dimethanol, 1,2-cyclohexanol, trimethylolpropane, diethanolamine, triethanolamine, polyoxypropylene, oxyethylene oxypropylene block copolymer, pentaerythritol, and sorbitol;

epoxy compounds, such as (poly)ethylene glycol diglycidyl ether, (poly)glycerol polyglycidyl ether, diglycerol polyglycidyl ether, (poly)propylene glycol diglycidyl ether, and glycidol;

polyamine compounds such as ethylenediamine, diethylenetriamine, triethylenetetraamine, tetraethylenepentaamine, pentaethylenehexaamine, polyamidepolyamine, and polyethyleneimine, and condensates of these polyamines and haloepoxy compounds;

polyfunctional isocyanurate compounds, such as 2,4-tolylene diisocyanate and hexamethylene diisocyanate;

polyfunctional oxazoline compounds, such as 1,2-ethylene bisoxazoline;

silane coupling agents, such as γ-glycidoxypropyltrimetoxysilane, and γ-aminopropyltrimetoxysilane;

alkylene carbonate compounds, such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one;

haloepoxy compounds, such as epichlorohydrin, epibromohydrin, and α-methylepichlorohydrin; and hydroxides and chlorides of polyvalent metals such as zinc, calcium, magnesium, aluminum, iron and zirconium.

The amount of the crosslinking agent is not particularly limited, but is preferably within the range of from 0.0001 mole percent to 10 mole percent, and more preferably from 0.001 mole percent to 1 mole percent, based on the monomer component.

In the present invention, since the method of polymerizing the monomer component is not particularly restricted, it is possible to use various known conventional polymerization methods, such as bulk polymerization, precipitation polymerization, aqueous solution polymerization, and reversed-phase suspension polymerization. Among these polymerization methods, aqueous solution polymerization or reversed-phase suspension polymerization of an aqueous solution of the monomer component is more preferred because the resultant water-absorbent resin can have improved absorption properties and the polymerization can be controlled easily.

Examples of aqueous solution polymerization include (i) thin-film polymerization that is performed on a belt conveyer to form a thin film; (ii) polymerization performed by placing an aqueous solution of the monomer component into a predetermined cast; and (iii) a polymerization method including polymerizing an aqueous solution of the monomer component using a mixer such as a kneader having an agitating blade of a predetermined shape as a polymerization device, and dividing the generated crosslinked hydrogel polymer into small pieces by the shearing force of the agitating blade.

It is preferred to perform polymerization while leaving the monomer component at rest without agitating it during polymerization. Moreover, the above-mentioned aqueous solution polymerization of the ethylenically unsaturated monomer can be performed as continuous polymerization or batch-wise polymerization, under any pressure conditions including atmospheric pressure, reduced pressure, and increased pressure. The polymerization is preferably performed in the flow of inert gases, such as nitrogen, helium, argon, and carbon dioxide.

An example of the above-mentioned reversed-phase suspension polymerization is polymerization performed by suspending an aqueous solution of the monomer component in a hydrophobic organic solvent under the presence of a dispersant. By using the reversed-phase suspension polymerization technique, spherical (particulate) crosslinked hydrogel polymers are obtained at the time the polymerization is complete.

When starting the polymerization, it is possible to use a polymerization initiator, or activation energy radiation such as radioactive rays, electron rays, ultraviolet rays, electromagnetic rays. More specifically, examples of the polymerization initiator are radical polymerization initiators, including:

inorganic peroxides, such as sodium persulfate, ammonium persulfate, potassium persulfate, and hydrogen peroxide;

organic peroxides, such as t-butyl hydroperoxide, benzoyl peroxide, and cumene hydroperoxide; and azo compounds, such as 2,2'-azobis(N,N'-dimethyleneisobutylamidine) or salt thereof, 2,2'-azobis(2-methylpropionamidine) or salt thereof, 2,2'-azobis(2-amidinopropane) or salt thereof, and 4,4'-azobis-4-cyano valeric acid. These polymerization initiators can be used individually or in combination of two or more kinds thereof. In the case when a peroxide is used as the polymerization initiator, redox polymerization can be performed using a reducing agent, for example, sulfite, bisulfite, or L-ascorbic acid.

In order to improve the absorption properties, it is preferred that the crosslinked hydrogel polymer produced by polymerization of the monomer component has cells therein. Such a crosslinked hydrogel polymer having cells therein can be easily obtained by polymerizing the monomer component under the presence of a crosslinking agent so as to contain cells. More specifically, as the polymerization method, it is possible to use various conventional known methods, for example, polymerization under the presence of an azo initiator; polymerization using carbonate as a blowing agent (Japanese publication of unexamined patent applications (Tokukaihei) Nos. 5-237378 and 7-185331); polymerization carried out by dispersing a water-insoluble blowing agent such as pentane and trifluoroethane in the monomer (U.S. Pat. Nos. 5,328,935 and 5,338,766); polymerization using a solid particulate blowing agent (Publication of International Patent Application No. W096/17884); and polymerization carried out while dispersing an inert gas under the presence of a surface active agent.

When polymerizing the monomer component under the presence of the crosslinking agent, it is preferable to use the aqueous solutions of the monomer component and crosslinking agent so as to improve the absorption properties of the resultant water-absorbent resin and the blowing efficiency of the blowing agent. Namely, it is preferable to perform aqueous solution polymerization using water as a solvent.

The concentration of the monomer component in the aqueous solution (hereinafter just referred to as the "aqueous monomer solution") is preferably within the range of from 20 weight percent to 60 weight percent. When the concentration of the monomer component is less than 20 weight percent, there is a possibility that the water-soluble component content in the resultant water-absorbent resin increases and the absorption rate is not increased due to insufficient blowing by the blowing agent. On the other hand, when the concentration of the monomer component exceeds 60 weight percent, it may be impossible to control the reaction temperature, and blowing by the blowing agent.

It is also possible to use water and a water-soluble organic solvent together as a solvent for the aqueous monomer solution. More specifically, examples of such an organic solvent are methyl alcohol, ethyl alcohol, acetone, dimethyl sulfoxide, ethylene glycol monomethyl ether, glycerin, (poly)ethylene glycol, (poly)propylene glycol, and alkylene carbonate. These organic solvents may be used individually, or in combination of two or more kinds thereof.

When adding the blowing agent to the aqueous monomer solution, the aqueous monomer solution is agitated before polymerization so as to mix the blowing agent and the monomer solution. However, during polymerization, it is preferable to leave the aqueous monomer solution at rest without agitation.

As the blowing agent, it is possible to use compounds which are dispersible or soluble in the aqueous monomer solution, such as volatile organic solvent dispersible or soluble in the aqueous monomer solution, compounds which are solid at normal temperature and slightly soluble in water and organic solvents, carbonate, and dry ice. More specifically, examples of the blowing agent include:

organic compounds, such as n-pentane, 2-methylbutane, 2,2-dimethylpropane, hexane, heptane, benzene, substituted benzene, chloromethane, chloroethane, chlorofluoromethane, 1,1,2-trichlorotrifluoroethane, methanol, ethanol, isopropanol, acetone, azodicarbonamide, azobisisobutyronitrile, barium azodicarboxylate, dinitrosopentamethylenetetramine, 4,4'-oxybis(benzene-sulfonylhydrazide), p-toluenesulfonylhydrazide, diazoaminobenzene, N,N'-dimethyl-N,N'-dinitrosoterephthalamide, nitrourea, acetone-p-toluenesulfonylhydrazone, p-toluenesulfonylazide, 2,4-toluenedisulfonylhydrazide, p-methylurethane benzene-sulfonyl hydrazide, trinitrosotrimethylenetriamine, p-toluenesulfonylsemicarbazide, oxalyl hydrazide, nitroguanidine, hydroazocarbonamide, trihydrazino triamine, azobis formamide, benzenesulfonylhydrazide, benzene-1,3-disulfonylhydrazide, diphenylsulfone- 3,3'-disulfonylhydrazide, 4,4'-oxybis(benzenesulfonylhydrazide), sulfone hydrazide, malonic acid and salts thereof, and carbamic acid and salts thereof;

inorganic compounds, such as carbonates including sodium bicarbonate, ammonium carbonate, ammonium bicarbonate, ammonium nitrite, basic magnesium carbonate, and calcium carbonate; and acrylic acid salts of azo-compounds containing an amino group, represented by general formula (1)

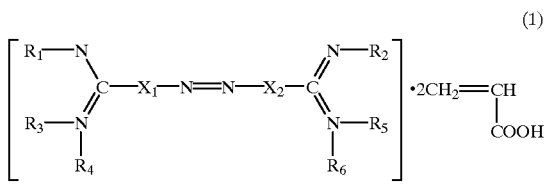

(wherein $X_1$ and $X_2$ independently represent an alkylene group having 1 to 4 carbons, $R_1$, $R_2$, $R_3$, $R_4$, $R_5$, and $R_6$ independently represent a hydrogen atom, alkyl group having 1 to 4 carbons, aryl group, allyl group or benzyl group), or general formula (2)

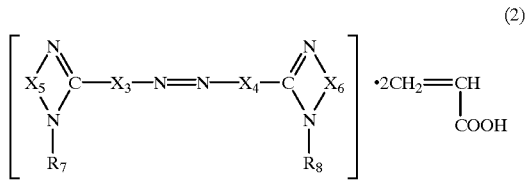

(wherein $X_3$ and $X_4$ independently represent an alkylene group having 1 to 4 carbons, $X_5$ and $X_6$ independently represent an alkylene group having 2 to 4 carbons, and $R_7$ and $R_8$ independently represent a hydrogen atom or alkyl group having 1 to 4 carbons). These blowing agents may be used individually, or in combination of two or more kinds thereof. In the case when a carbonate such as sodium carbonate is used as the blowing agent, it is preferable to use a surface active agent or dispersant together. With the use of the surface active agent or dispersant, it is possible to prevent the average cell diameter of the cells in the resultant crosslinked hydrogel polymer from becoming too large, and the absorption rate from being lowered.

Among the above exemplified blowing agents, acrylic acid salts of azo-compound containing an amino group are particularly preferred because such an acrylic acid salt can be evenly dispersed in the aqueous monomer solution in a still state while retaining its average particle diameter at a predetermined value without using a surface active agent or a dispersing agent such as water-soluble polymer, or agitating the aqueous monomer solution. Moreover, the acrylic acid salt does not cause sedimentation, floatation nor separation. Additionally, the acrylic acid salts of azo-compounds containing an amino group exhibit excellent dispersibility with respect to acrylic acid salt monomers.

More specifically, the acrylic acid salts of azo-compounds containing an amino group represented by general formula (1) or (2) include, but are not necessarily limited to, 2,2'-azobis(2-methyl-N-phenyl propionamidine) diacrylate, 2,2'-azobis[N-(4-chlorophenyl)-2-methylpropionamidine] diacrylate, 2,2'-azobis[N-(4-hydroxyphenyl)-2-methylpropionamidine] diacrylate, 2,2'-azobis[2-methyl-N-(phenylmethyl)-propionamidine] diacrylate, 2,2'-azobis[2-methyl-N-(2-propenyl)-propionamidine] diacrylate, 2,2'-azobis(2-methylpropionamidine) diacrylate, 2,2'-azobis[N-(2-hydroxyethyl)-2-methylpropionamidine] diacrylate, 2,2'-azobis[2-(5-methyl-2-imidazolin-2-yl)propane] diacrylate, 2,2'-azobis[2-(2-imidazolin-2-yl)propane] diacrylate, 2,2'-azobis-[2-(4,5,6,7-tetrahydro-1H-1,3-diazepin-2-yl)propane] diacrylate, 2,2'-azobis[2-(3,4,5,6-tetrahydropyrimidine-2-yl)propane] diacrylate, 2,2'-azobis[2-(5-hydroxy-3,4,5,6-tetrahydropyrimidin-2-yl)propane] diacrylate, and 2,2'-azobis{2-[1-(2-hydroxyethyl)-2-imidazolin-2-yl]propane} diacrylate.

The acrylic acid salt of azo-compound containing an amino group can be easily isolated by, for example, precipitating the acrylic acid salt in an aqueous monomer solution and then filtering. When precipitating the acrylic acid salt of azo-compound containing an amino group in the aqueous monomer solution, the aqueous monomer solution may be cooled down, if necessary.

The acrylic acid salts of azo-compounds containing an amino group function as both the blowing agent and the radical polymerization initiator. By polymerizing the monomer under the presence of the acrylic acid salt of an azo-compound containing an amino group, it is possible to obtain a water-absorbent resin having further reduced water-soluble component content and residual monomer content. More specifically, by using the acrylic acid salt of the azo-compound containing an amino group, it is possible to obtain a water-absorbent resin containing the water-soluble component in an amount of not higher than 20 weight percent, and the residual monomers in an amount of not higher than 1,000 ppm.

In the present invention, the blowing agent can be added to the aqueous monomer solution before or during polymerization of the aqueous monomer solution, or to a crosslinked hydrogel polymer resulting from polymerization of the aqueous monomer solution. As the blowing agent, a blowing agent prepared beforehand can be added to the aqueous monomer solution, or a blowing agent can be prepared by dissolving a precursor of the blowing agent (hereinafter referred to as the "blowing agent precursor") in the aqueous monomer solution, and then adding carbon dioxide gas or acrylic acid salt to the aqueous monomer solution, if necessary. Namely, it is possible to precipitate the blowing agent by reacting the blowing agent precursor with the carbon dioxide gas or acrylic acid salt in the aqueous monomer solution. A preferred example of the acrylic acid salt is sodium acrylate. When the ethylenically unsaturated monomer is an acrylic acid salt monomer, the ethylenically unsaturated monomer can function as the acrylic acid salt.

More specifically, when the blowing agent is an inorganic compound, it is possible to use, for example, calcium oxide, magnesium oxide, etc. as the blowing agent precursor.

When the blowing agent is an acrylic acid salt of an azo-compound containing an amino group, the blowing agent precursor is hydrochloride of the azo-compound containing an amino group. More specifically, examples of the blowing agent precursor include 2,2'-azobis(2-methyl-N-phenylpropionamidine) dihydrochloride, 2,2'-azobis[N-(4-chlorophenyl)-2-methyl-propionamidine] dihydrochloride, 2,2'-azobis[N-(4-hydroxyphenyl)-2-methylpropionamidine] dihydrochloride, 2,2'-azobis[2-methyl-N-(phenylmethyl)-propionamidine] dihydrochloride, 2,2'-azobis[2-methyl-N-(2-propenyl)-propionamidine] dihydrochloride, 2,2'-azobis(2-methylpropionamidine) dihydrochloride, 2,2'-azobis[N-(2-hydroxyethyl)-2-methyl-propionamidine] dihydrochloride, 2,2'-azobis[2-(5-methyl-2-imidazolin-2-yl)propane] dihydrochloride, 2,2'-azobis[2-(2-imidazoline-2-yl)propane] dihydrochloride, 2,2'-azobis-[2-(4,5,6,7-tetrahydro-1H-1,3-diacepin-2-yl)propane] dihydrochloride, 2,2'-azobis[2-(3,4,5,6-tetrahydropyrimidin-2-yl)propane] dihydrochloride, 2,2'-azobis[2-(5-hydroxy-3,4,5,6-tetrahydropyrimidin-2-yl)propane] dihydrochloride, and 2,2'-azobis{2-[1-(2-hydroxyethyl)-2-imidazolin-2-yl]propane} dihydrochloride. These dihydrochlorides of azo-compounds containing an amino group are heat decomposable azo polymerization initiators.

The condition for producing an acrylic acid salt of an azo-compound containing an amino group by reacting the hydrochloride of the azo-compound containing an amino group with an acrylic acid salt is not particularly limited, but the following conditions are preferred. Namely, it is preferred to arrange the pore diameter of the resultant water-absorbent resin to a desired size by freely setting the conditions and suitably adjusting the particle diameter of the acrylic acid salt of the azo-compound containing an amino group during dispersion.

More specifically, the set temperature is preferably within the range of from −10° C. to 50° C., and more preferably from 0° C. to 40° C. As the acrylic acid salts, alkaline metal acrylate is preferred, and sodium acrylate is more preferred. The neutralization ratio of the acrylic acid salt is preferably not lower than 50 mole percent, and more preferably not lower than 70 mole percent. The concentration of the acrylic acid salt in the aqueous monomer solution is preferably within the range of from 20 weight percent to a saturated concentration, and more preferably from 25 weight percent to the saturation concentration.

Moreover, when preparing an acrylic acid salt of an azo-compounds containing an amino group, it is desirable to agitate the aqueous monomer solution. By agitating the aqueous monomer solution at a rate not lower than 10 rpm, and more preferably at a rate ranging from 20 rpm to 10,000 rpm, it is possible to prepare an acrylic acid salt of an azo-compound containing an amino group having a substantially uniform particle diameter within a short time. The prepared acrylic acid salt of azo-compound containing an amino group can be directly used for the polymerization of the monomer component without the necessity of isolation.

As a method of preparing an acrylic acid salt of an azo-compound containing an amino group in an aqueous monomer solution, i.e., a method of dispersing the acrylic acid salt of the azo-compound containing an amino group in an aqueous monomer solution, for example, the following two methods are given. A method of preparing an aqueous monomer solution by adding the hydrochloride of an azo-compound containing an amino group to an acrylic acid salt having a neutralization ratio of 100 percent so as to prepare an acrylic acid salt of the azo-compound containing an amino group, and then mixing an ethylenically unsaturated monomer, such as an acrylic acid which has not been neutralized, a cross-linking agent, and a solvent if necessary, with the acrylic acid salt. A method of preparing an aqueous monomer solution in which an acrylic acid salt of an azo-compound containing an amino group is dispersed, by adding hydrochloride of the azo-compound containing an amino group, and an acrylic acid salt if necessary, to an aqueous monomer solution which was prepared beforehand. The latter method is more preferred because it can more efficiently prepare the acrylic acid salt of the azo-compound containing an amino group with a uniform particle diameter. It is also possible to adjust the concentration of the ethylenically unsaturated monomer in the aqueous monomer solution to a desired level by adding a solvent such as water to the aqueous monomer solution after preparing the acrylic acid salt of the azo-compound containing an amino group.

The amount of the blowing agent with respect to the monomer is not particularly limited, and is suitably set depending on a combination of the monomer and the blowing agent. However, the blowing agent is used in an amount ranging preferably from 0.001 weight part to 10 weight parts based on 100 weight parts of the monomer. When the amount of the blowing agent is out of the above-mentioned range, the resultant water-absorbent resin may not have sufficient absorption properties.

The average particle diameter of the blowing agent which is present in a dispersed state in the aqueous monomer solution during polymerization is preferably within the range of from 1 μm to 500 μm. By setting the average particle diameter of the blowing agent within the above-mentioned range, it is possible to adjust the average pore diameter of the water-absorbent resin within the range of from 10 μm to 1,000 μm, thereby improving the absorption properties of the water-absorbent resin (for example, the dispersibility and absorption rate of the aqueous liquid). Namely, it is possible to set the average pore diameter of the water-absorbent resin within a desired range by setting the average particle diameter of the blowing agent.

If the average particle diameter of the blowing agent is smaller than 1 μm, the degree of blowing becomes insufficient, and the average pore diameter of the water-absorbent resin cannot be adjusted within the desired range. On the other hand, if the average particle diameter of the blowing agent is larger than 500 μm, the average pore diameter of the water-absorbent resin cannot be adjusted within the desired range. In addition, the gel strength of the resultant water-absorbent resin decreases and the water-soluble component content increases unfavorably. The average particle diameter of the blowing agent in the aqueous monomer solution can be easily measured with a laser-type particle size distribution measuring apparatus.

Besides, it is possible to obtain a crosslinked hydrogel polymer containing cells therein by polymerizing the monomer component in a state in which an inert gas inert to polymerization, for example, nitrogen, carbon dioxide, argon, helium, or air, is dispersed in the aqueous monomer solution. Since there is no possibility that the dispersed inert gas interferes with polymerization of the monomer component, a porous crosslinked hydrogel polymer containing cells therein can be stably obtained. As a result, it is possible to stably obtain a water-absorbent resin with excellent absorption properties, including the water absorbing capacity under no-pressure, absorption rate, and water absorbing capacity under applied pressure. In addition, with the use of a surface active agent, etc. to be described later, the size and distribution of the cells dispersed in the crosslinked hydrogel polymer can be easily adjusted, thereby providing a desired water-absorbent resin.

As a method for dispersing the inert gas in the aqueous monomer solution, it is possible to use a method adopting introducing the inert gas into the aqueous monomer solution, a method adopting strongly agitating the aqueous monomer solution at high speeds, and a method adopting adding a blowing agent in advance. It is also possible to disperse the cells of the inert gas in the aqueous monomer solution by a combination of these methods. Examples of the method adopting strong agitation of the aqueous monomer solution at high speeds include strong agitation of the aqueous monomer solution using a stirrer and an agitating element, and strong agitation of the aqueous monomer solution using a high-speed homogenizer and an ultrasonic homogenizer.

The volume of the aqueous monomer solution in which the cells of the inert gas are dispersed is preferably no less than 1.02 times, more preferably, no less than 1.08 times, still more preferably no less than 1.11 times, and most preferably no less than 1.2 times of the volume of the aqueous monomer solution in which the cells of the inert gas are not dispersed.

In polymerization carried out under agitation by a conventional process, there is a possibility that cells are included in the aqueous monomer solution. However, the present inventor confirmed that even if the aqueous monomer solution includes the cells therein during the normal process, the change in volume resulting from the inclusion of the cells is less than 1.01 times of the volume of the aqueous monomer solution in which the cells are not dispersed. The volume of the aqueous monomer solution in which the cells of the inert gas are dispersed becomes 1.02 or more times of the volume of the aqueous monomer solution in which the cells of the inert gas are not dispersed as a result of causing intentionally the crosslinked hydrogel polymer to contain the cells by the above-mentioned method. Consequently, a water-absorbent resin having further improved absorption properties can be obtained. The state in which the cells of the inert gas are dispersed in the aqueous monomer solution can be easily confirmed by eyes because the transparency of the aqueous monomer solution is lowered. Moreover, the change of the volume of the aqueous monomer solution can be easily confirmed because the change of volume is seen as a change in the height of the water line in the reaction container.

When dispersing the cells of the inert gas in the aqueous monomer solution, it is preferred to use a surface active agent together. With the use of the surface active agent, the cells can be stably dispersed. In addition, the diameter and distribution of the cells can be more easily controlled by the surface active agent.

As the surface active agent, it is possible to use an anionic surface active agent, nonionic surface active agent, cationic surface active agent, amphoteric surface active agent, etc.

More specifically, examples of the anionic surface active agent include:

fatty acid salts, such as mixed fatty acid sodium salt soap, semi-hardened tallow sodium salt soap, sodium stearate soap, potassium oleate soap, sodium oleate soap, and caster oil potassium salt soap;

alkyl sulfate salts, such as sodium lauryl sulfate, ammonium lauryl sulfate, higher alcohol sodium sulfate, and triethanolamine lauryl sulfate;

alkylbenzenesulfonates, such as sodium dodecylbenzene sulfonate;

alkylnaphthalenesulfonates, such as sodium alkylnaphthalenesulfonate;

alkylsulfosuccinates, such as sodium dialkylsulfosuccinate;

alkyl diphenyl ether disulfonates, such as sodium alkyl diphenyl ether disulfonate;

alkyl phosphates, such as potassium alkyl phosphate;

polyoxyethylene alkyl(or alkylallyl) sulfate, such as sodium polyoxyethylene lauryl ether sulfate, sodium polyoxyethylene alkyl ether sulfate, triethanol amine polyoxyethylene alkyl ether sulfate, and sodium polyoxyethylene alkyl phenyl ether sulfate;

special reaction-type anionic surface active agents;

special carboxylic acid surface active agents;

naphthalenesulfoniate and formaldehyde condensation, such as sodium β-naphthalenesulfonate and formaldehyde condensation and special aromatic sulfonate and formaldehyde condensation;

special polycarboxylic acid polymeric surface active agents; and polyoxyethylene alkyl phosphates. However, the anionic surface active agent is not particularly limited to these examples.

More specifically, examples of the nonionic surface active agent include:

polyoxyethylene alkyl ethers such as polyoxyethylene lauryl ether, polyoxyethylene cetyl ether, polyoxyethylene stearyl ether, polyoxyethylene oleyl ether and polyoxyethylene higher alcohol ether, and polyoxyethylene alkyl aryl ethers such as polyoxyethylene nonyl phenyl ether;

polyoxyethylene derivatives;

sorbitan fatty esters, such as sorbitan monolaurate, sorbitan monopalmitate, sorbitan monostearate, sorbitan tristearate, sorbitan monooleate, sorbitan trioleate, sorbitan sesquioleate, and sorbitan distearate;

polyoxyethylene sorbitan fatty esters, such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate;

polyoxyethylene sorbitol fatty esters, such as polyoxyethylene sorbitol tetraoleate;

glycerol fatty esters, such as glycerol monostearate, glycerol monooleate, and self-emulsifiable glycerol monostearate;

polyoxyethylene fatty esters, such as polyethylene glycol monolaurate, polyoxyethylene glycol monostearate, polyethylene glycol distearate, and polyethylene glycol monooleate;

polyoxyethylene alkylamine;

polyoxyethylene hardened caster oil; and alkyl alkanolamide. However, the nonionic surface active agent is not particularly limited to these examples.

More specifically, examples of the cationic surface active agent and amphoteric surface active agent include:

alkyl amine salts, such as coconut amine acetate and stearyl amine acetate;

quaternary ammonium salts, such as lauryltrimethylammonium chloride, stearyltrimethylammonium chloride, cetyltrimethylammonium chloride, distearyldimethylammonium chloride, and alkylbenzyldimethylammonium chloride;

alkylbetaines, such as lauryl betaine, stearyl betaine, and lauryl carboxymethyl hydroxyethyl imidazolinium betaine; and amine oxides such as lauryldimethyl amine-N-oxide. However, the cationic surface active agent and amphoteric surface active agent are not particularly limited to these examples.

Furthermore, as the surface active agent, it is possible to use fluorochemical surface active agents. With the use of a fluorochemical surface active agent, it is possible to disperse the cells of the inert gas in the aqueous monomer solution stably for a long time, and easily control the amount and diameter of the cells. Moreover, the resultant water-absorbent resin is a foam and porous resin with a high absorption rate. The fluorochemical surface active agent used in the present invention is not particularly limited, and various conventional known agents can be used. A suitable example is an agent that is produced by making a perfluoroalkyl group by substituting hydrogen of the lipophilic group of a general surface active agent with fluorine, and has significantly strengthened surface activity.

Four types (anionic, nonionic, cationic, amphoteric) surface active agents are produced by changing the hydrophilic group of the fluorochemical surface active agent. In the case of a hydrophobic group, a fluorocarbon chain of the same structure is often used. The carbon chain as the hydrophobic group can be a straight chain or a branch chain. More specifically, examples of the fluorochemical surface active agents include fluoroalkyl($C_2$ to $C_{10}$)carboxylic acid, disodium N-perfluorooctylsulfonyl glutamate, sodium 3-[fluoroalkyl($C_6$ to $C_{11}$)oxy]-1-alkyl($C_3$ to $C_4$) sulfonate, sodium 3-[ω-fluoroalkanoyl($C_6$ to $C_8$)-N-ethylamino]-1-propanesulfonate, N-[3-(perfluorooctylsulfonamide) propyl]-N,N'-dimethyl-N-carboxyl methylene ammonium betaine, fluoroalkyl ($C_{11}$ to $C_{20}$)carboxylic acid, perfluoroalkylcarboxylic acid($C_7$ to $C_{13}$), diethanolamide perfluorooctylsulfonate, perfluoroalkyl (C4 to $C_{12}$) sulfonate (Li, K, Na), N-propyl-N-(2-hydroxyethyl) perfluorooctylsulfonamide, perfluoroalkyl ($C_6$ to $C_{10}$) sulfonamide propyltrimethyl ammonium salt, perfluoroalkyl ($C_6$ to $C_{10}$)-N-ethylsulfonyl glycinato (K), bis (N-perfluorooctylsulfonyl-N-ethylaminoethyl) phosphate, monoperfluoroalkyl ($C_6$ to $C_{16}$)ethyl phosphate, perfluoroalkyl quaternary ammonium iodide ("Fluorad FC-135" as a cationic fluorochemical surface active agent available from Sumitomo 3M Ltd.), perfluoroalkyl alkoxylate ("Fluorad FC-171" as nonionic fluorochemical surface active agent available from Sumitomo 3M Ltd.), and potassium perfluoroalkyl sulfonate ("Fluorad FC-95 and Fluorad FC-98" as anionic fluorochemical surface active agents available from Sumitomo 3M Ltd.). However, the surface active agent is not particularly limited to these examples. Besides, these surface active agents can be used individually or in combination of two or more kinds thereof.

The amount of the surface active agent to be used is preferably within the range of from 0.0001 weight part to 10 weight parts, and more preferably from 0.0003 weight part to 5 weight parts, based on 100 weight parts of the total of the water-soluble unsaturated monomer and water-soluble crosslinked monomer. When the amount of the surface active agent is less than 0.0001 weight part, there is a possibility that the absorption rate is not sufficiently improved. On the other hand, when the surface active agent exceeds 10 weight parts, there is a possibility that the effect corresponding to the increase in the amount of the surface active agent is not produced, causing uneconomical results.

The use of the surface active agent in aqueous solution polymerization has been known. However, the absorption rate was not improved by such a known technique.

The water content in a crosslinked hydrogel polymer prepared in the above-mentioned process is usually within the range of from 10 to 90 weight percent, and more preferably from 20 to 80 weight percent. When the water content is less than 10 weight percent, it may be difficult to cut and crush the crosslinked hydrogel polymer. In the case of the crosslinked hydrogel polymer containing cells, the cells may be broken. On the other hand, when the water content is higher than 90 weight percent, it takes to much time to dry the crosslinked hydrogel polymer after crushing.

In the present invention, the water-absorbent resin can be obtained by crushing and drying the crosslinked hydrogel polymer. According to the process for producing a water-absorbent resin of the present invention, since the crosslinked hydrogel polymer can be crushed without kneading, it is possible to restrain the increase in the water-soluble component content. Moreover, according to the present invention, even if the crosslinked hydrogel polymer contains cells therein, the cells are not crushed by kneading. It is therefore possible to obtain a water-absorbent resin with a high cell retention ratio and excellent absorption properties. In the present invention, 20 or more percent of the cells contained in the crosslinked hydrogel polymer before crushing can be retained after crushing. Namely, with the present invention, the crosslinked hydrogel polymer containing cells is crushed so that reduction in the number of the cells is restrained.

More specifically, examples of the crushing method include: crushing the crosslinked hydrogel polymer using a crushing machine having a rotary blade; and crushing the crosslinked hydrogel polymer after freezing it. Furthermore, crushing the crosslinked hydrogel polymer using the crushing machine having the rotary blade include: crushing the crosslinked hydrogel polymer by shearing it with a fixed blade and a rotary blade; crushing the crosslinked hydrogel polymer with a cutter having a pair of rotary blades that rotate while at least partly overlapping each other; and crushing the crosslinked hydrogel polymer with a cutter having a rotary blade using a lubricant.

First, with reference to FIG. 4, the method of crushing the crosslinked hydrogel polymer by shearing it with the fixed blade and rotary blade will be explained. As illustrated in FIG. 4, a rotary crusher 31 (crushing machine) used for crushing the crosslinked hydrogel polymer according to this method has a cylindrical casing 32. More specifically, inside the casing 32, i.e., crushing room, 1 to 4 pieces (3 pieces in FIG. 4) of fixed blade 33 are arranged in a circumferential direction and fixed on the inner wall of the casing 32, and a rotation shaft 34 which is rotated by a drive motor (not shown) is provided. The rotation shaft 34 is arranged parallel to the fixed blade 33. A plurality of rotary blades 35 (usually 2 to 5 pieces, and 3 pieces in FIG. 4) are arranged at equal intervals around the rotation shaft 34. Each rotary blade 35 faces the outside in a radial direction of the rotation shaft 34. The rotary blades 35 are mounted to extend in a direction vertical to the axis direction of the rotation shaft 34. Furthermore, the rotary blade 35 and the fixed blade 33 are arranged so that their facing surfaces are disposed at a uniform interval and substantially parallel to each other.

The space between the rotary blade 35 and the fixed blade 33 facing the rotary blade 35 is preferably within the range of 0.01 mm to 2 mm, and more preferably from 0.05 mm to 0.5 mm. The size of the crosslinked hydrogel polymer after crushed is decided by the size of the space between the fixed blade 33 and the rotary blade 35. Therefore, if the space between the fixed blade 33 and the rotary blade 35 is too broad, the crosslinked hydrogel polymer cannot be crushed finely. On the other hand, if the space between the fixed blade 33 and the rotary blade 35 is less than 0.01 mm, the crushed crosslinked hydrogel polymer becomes too small, and it takes to much time to crush the crosslinked hydrogel polymer. Accordingly, it is preferred to set the space between the fixed blade 33 and the rotary blade 35 within the above-mentioned range.

Moreover, a pre-cutter 36, and a screen 37 in the form of a circular arc are provided inside the casing 32. The pre-cutter 36 for granulating the relatively large crosslinked hydrogel polymer is fixed to the rotation shaft 34. The screen 37 is arranged along and outside of an arc of a circle drawn by a rotation of the rotary blade 35. The screen 37 is provided with a plurality of holes 37a arranged in the form of circular holes or grids. The form of the holes 37a is not particularly restricted, but is preferably in a grid form because the grid-like holes are hardly clogged with the crosslinked hydrogel polymer.

In the rotary crusher 31, the crosslinked hydrogel polymer located between adjacent rotary blades 35 is extruded the outside in a radial direction of the rotation shaft 34 due to its own weight upon receipt of centrifugal forces of the rotating rotary blades 35, and is held between the fixed blade 33 and the rotary blade 35. The crosslinked hydrogel polymer held between the fixed blade 33 and the rotary blade 35 is immediately cut, i.e., sheared, by the fixed blade 33 and rotary blade 35, and thus crushed. At this time, the crosslinked hydrogel polymer does not adhere to the inside of the rotary crusher 31, fixed glade 33 and rotary blade 35 because the crosslinked hydrogel polymer has a crosslinked structure, and therefore has predetermined hardness and viscosity greater than a conventional water-soluble polymeric gel. Thus, the crosslinked hydrogel polymer is easily crushed by the rotary crusher 31. The crushed crosslinked hydrogel polymer is scattered toward the outside of the arc of a circle drawn by the rotation of the rotary blade 35 due to the centrifugal forces, and the crosslinked hydrogel polymer having a diameter smaller than that of the hole 37a of the screen 37 passes through the hole 37a and is discharged. Accordingly, by setting the hole 37a of the screen 37 to a suitable size, it is possible to obtain the crosslinked hydrogel polymer having a desired particle diameter.

The discharge of the crosslinked hydrogel polymer is performed preferably by suction. By sucking the crosslinked hydrogel polymer from the discharge side, i.e., outside, of the screen 37, the crushed crosslinked hydrogel polymer is more easily discharged, and prevented from being excessively cut.

The crushing time in the rotary crusher 31 (casing 32), i.e., the residual time of the crosslinked hydrogel polymer in the rotary crusher 31, is set suitably according to the amount of the crosslinked hydrogel polymer to be placed therein, the sizes of the fixed blade 33 and rotary blade 35, the rotation speed of the rotary blade 35, or the size of the crushed crosslinked hydrogel polymer, but is preferably not less than 1 second but less than 3 minutes, and more preferably not less than 5 seconds but less than 1 minute. When the crushing time is less than 1 second, the crosslinked hydrogel polymer is not crushed sufficiently. On the other hand, when the crushing time is 3 minutes or longer, there is a possibility that the cells contained in the crosslinked hydrogel polymer are crushed by kneading and the crosslinked hydrogel polymer becomes too small after crushed.

The particle size of the crushed crosslinked hydrogel polymer needs to be set so that the crosslinked hydrogel polymer particles are sufficiently dried through the inside thereof in the drying step, and is preferably within the range of from 0.1 mm to 30 mm and more preferably from 1 mm to 15 mm. When the particle diameter of the crushed crosslinked hydrogel polymer is smaller than 0.1 mm, clogging tends to occur in drying the water-absorbent resin, resulting in a lowering of the drying efficiency and breaking of the cells in the crosslinked hydrogel polymer. On the other hand, when the particle diameter of the crushed crosslinked hydrogel polymer is larger than 30 mm, it is difficult to sufficiently dry the water-absorbent resin through the inside thereof. In the case when the crosslinked hydrogel polymer prepared by aqueous solution polymerization is in a form of lump, it is preferable to crush the crosslinked hydrogel polymer to particles having a predetermined particle diameter.

The crushed crosslinked hydrogel polymer is discharged through a grate (not shown) provided outside of the screen 37 of the rotary crusher 31. Since the diameter of the grate is generally within the range of from 1 mm to 50 mm, the crushed crosslinked hydrogel polymer can be discharged without causing the holes 37a of the screen 37 to be clogged with the crushed crosslinked hydrogel polymer by sucking because the adhesive property of the crushed crosslinked hydrogel polymer is lowered due to crosslinking.

As described above, in the above-mentioned rotary crusher 31, a substantially uniform force is applied to the crosslinked hydrogel polymer in a moving direction by the centrifugal forces, thereby moving the crosslinked hydrogel polymer outward in a radial direction of the rotation shaft 34. Namely, the crosslinked hydrogel polymer moves into the space between the fixed blade 33 and the rotary blade 35 due to the centrifugal forces, and is crushed. Therefore, unlike a conventional crushing method, for example, crushing using a meat chopper, the crosslinked hydrogel polymer is not pressed or kneaded by a screw in moving. Accordingly, with the use of the rotary crusher 31, it is possible to restrain the decrease in the number of cells due to the movement of the crosslinked hydrogel polymer.

Moreover, in the crusher 31, the crosslinked hydrogel polymer located between the fixed blade 33 and rotary blade 35 is cut (sheared) by the fixed blade 33 and rotary blade 35, and thus crushed. Therefore, the pressing force applied to the entire crosslinked hydrogel polymer during crushing is reduced, thereby preventing the cells from being squashed by pressure during crushing.

Furthermore, the crushed crosslinked hydrogel polymer is scattered toward the outside of the arc of a circle drawn by the rotation of the rotary blade due to the centrifugal forces, and finally discharged through the holes 37a of the screen 37. Hence, the crosslinked hydrogel polymer is not excessively cut.

Accordingly, with the use of the rotary crusher 31, it is possible to crush the crosslinked hydrogel polymer while restraining the decrease in the number of cells contained in the crosslinked hydrogel polymer so that the crosslinked hydrogel polymer retains 20 or more percent of the cells after being crushed.

According to the above-mentioned process of the present invention, it is possible to obtain a porous water-absorbent resin with a higher cell retention ratio, which was only obtained by hands using scissors, etc. conventionally, compared to the one obtained by a conventional process in which the crosslinked hydrogel polymer is crushed by a screw-type extruder such as a meat chopper, or a kneader, for example, a (mechanical) pressure kneader, internal mixer, or banbury mixer.

Moreover, with the process of the present invention, since the crosslinked hydrogel polymer can be continuously and efficiently crushed with the fixed blades 33 and rotary blades 35, the crushing efficiency and the productivity can be improved compared to the conventional process in which the crosslinked hydrogel polymer is crushed by hands using scissors. Consequently, it is possible to industrially and easily mass-produce water-absorbent resins with excellent absorption properties such as water absorbing capacity, absorption rate, and water absorbing capacity under applied pressure, and reduced water-soluble component content and residual monomer content.

Referring now to FIGS. 5 to 9, the following description will explain the method of crushing the crosslinked hydrogel polymer by cutting it with a cutter having a pair of rotary blades that are mounted on different shafts and rotate while at least partly overlapping each other. As illustrated in FIGS. 5 and 6, a high-speed slit slicer 41 (crushing machine) used for crushing the crosslinked hydrogel polymer according to this method has rotation shafts 42 and 43 that are disposed parallel to and to face each other, and rotated by a drive motor (not shown). The rotation shaft 42 is provided with a plurality of disk-shaped rotary blades 42a that are disposed at uniform intervals perpendicularly to the axis direction of the rotation shaft 42. The rotation shaft 43 has a plurality of disk-shaped rotary blades 43a that are disposed at uniform intervals perpendicularly to the axis direction of the rotation shaft 43. The rotary blade 42a and the rotary blade 43a are arranged to form a pair so that at least a part of their disk faces are adjacent to each other. Hence, the rotary blades 42a and 43a rotate while at least partly overlapping each other.

Moreover, slits 44 through which the edges of the rotary blades 42a can go are formed in the regions of the rotation shaft 43, that face the rotary blades 42a, i.e., regions adjacent to regions in which the rotary blades 43a are mounted. It is possible that the slit 44 is only formed in a region adjacent to a region in which the rotary blade 43a is mounted, or that the slit 44 is formed integrally with the region in which the rotary blades 43a is mounted.

Besides, the rotation shaft 42 is slidable in a direction toward the rotation shaft 43. The rotary blade 42a that is fitted into the rotation shaft 42 is insertable and detachable by sliding it in the direction toward the rotation shaft 43. By sliding the rotation shaft 42, it is possible to change the width of the overlapped portion of the rotary blade 42a and rotary blade 43a.

More specifically, the distance D between the rotation shaft 42 and a region of the rotation shaft 43 where the slit 44 is not formed is adjustable within the range $D_1-D_3<D<D_1+D_2$, where $D_1$ is the length of the rotary blade 42a, i.e., the length from the position where the rotary blade 42a is connected to the rotation shaft 42 to the edge of the rotary blade 42a (the outside edge in a radial direction of the rotary blade 42a), $D_2$ is the length of the rotary blade 43a, i.e., the length from the position where the rotary blade 43a is connected to the rotation shaft 43 to the edge of the rotary blade 43a (the outside edge in a radial direction of the rotary blade 43a), and $D_3$ is the depth of the slit 44.

Therefore, with the use of the high-speed slit slicer 41 having the above-mentioned structure, it is possible to crush the crosslinked hydrogel polymer by cutting according to the size of the crosslinked hydrogel polymer by sliding the rotation shaft 42 when the crosslinked hydrogel polymer is smaller than $D_1+D_2$.

Moreover, the high-speed slit slicer 41 is provided with a feed conveyer 45 and a discharge conveyer 46. The feed conveyer 45 is disposed parallel to and to face the rotation shaft 43, and feeds the crosslinked hydrogel polymer to be crushed to the space between the pair of rotary shafts 42a and 43a, and the other pair of rotary blades 42a and 43a arranged to have a predetermined space therebetween (i.e., between adjacent rotary blades of the pairs of the rotary blades). The discharge conveyer 46 is disposed parallel to and to face the feed conveyer 45 through the rotation shaft 43 therebetween, and discharges and moves the crushed crosslinked hydrogel polymer. As a result, a mass of crosslinked hydrogel polymer is placed on the feed conveyer 45, cut into, for example, strips while passing between the pair of the rotary blades positioned with a uniform space therebetween, and moved to the discharge conveyer 46.

In the present invention, the size of the crushed crosslinked hydrogel polymer is preferably arranged to be within the range of from 1 to 50 mm, and more preferably from 2 to 30 mm, considering the efficiency of drying performed later. Therefore, the interval between adjacent rotary blades varies according to a desired width of the crosslinked hydrogel polymer after crushed (cut), but is preferably within the range of from 1 mm to 50 mm, and more preferably from 2 mm to 30 mm.

When crushing (cutting) the crosslinked hydrogel polymer, the crosslinked hydrogel polymer can be crushed into a desired size by passing it vertically, laterally and horizontally several times between adjacent rotary blades of the high-speed slit slicer 41. With the present invention, thus, the crosslinked hydrogel polymer is crushed into a desired size by cutting it beforehand, thereby simplifying and facilitating the drying of the crosslinked hydrogel polymer.

Moreover, in the high-speed slit slicer 41, since the adjacent pair of rotary blades 42a and 43a rotate while overlapping each other, the crosslinked hydrogel polymer can be easily cut, and the cut (crushed) polymer can be smoothly transported. More specifically, since the high-speed slit slicer 41 is provided with the rotary blade 43a that is mounted on the rotation shaft 43 facing the rotation shaft 42 and rotates while overlapping the rotary blade 42a mounted on the rotation shaft 42, the cut crosslinked hydrogel polymer can never be caught in the rotating rotation shaft 42. It is therefore possible to continuously cut the crosslinked hydrogel polymer, and continuously transport the crushed polymer. As the above-mentioned rotary blade, it is possible to use a rotary blade having a horizontal side blade.

In the present invention, the sizes of the rotary blades 42a and 43a are not particularly limited. In the structure shown in FIG. 7, the rotary blade 42a is made larger than the rotary blade 43a. However, the rotary blade 43a can be made larger than the rotary blade 42a, or the rotary blades 42a and 43a can be made in the same size. When the rotary blade 43a is larger than the rotary blade 42a, the slit is formed in the rotation shaft 42. In the case when the rotary blades 42a and 43a have the same size, both of the rotation shafts 42 and 43 are provided with slits. In this case, the distance D is adjustable within the range $D_1-D_3<D<D_1+D_2$, and the width of the overlapped portion of the rotary blade 42a and rotation shaft 43a is adjustable within a broader range than that of a case in which the rotary blade 42a and rotation shaft 43a have different sizes.

Thus, when crushing the crosslinked hydrogel polymer by cutting it with a cutter having a pair of rotary blades that are mounted on different shafts and rotate while at least partly overlapping each other, the length of the rotary blade used for cutting the crosslinked hydrogel polymer (the length $D_1$ of the rotary blade 42a) is made greater than the thickness (maximum: D) of the crosslinked hydrogel polymer to be cut by proving at least one of the shafts having the rotary blades with a slit through which the edge of the facing rotary blade can go, thereby permitting the crosslinked hydrogel polymer to be completely cut. It is thus possible to improve the crushing efficiency.

Moreover, when crushing the crosslinked hydrogel polymer by cutting it with a cutter (crushing machine) having the above-mentioned rotary blade, if a lubricant is used, the crosslinked hydrogel polymer can be crushed while maintaining the stereo-structure of the crosslinked hydrogel polymer more precisely.

The following description will explain a method of crushing the crosslinked hydrogel polymer by cutting it with a cutter having a rotary blade using a lubricant.

As the lubricant used in the present invention, it is possible to use any lubricant if it can prevent the crosslinked hydrogel polymer from adhering to the rotary blade. Examples of such a lubricant include: water; hydrophilic organic solvents such as alcohol and acetone; organic solvents such as heavy oil, hexane, and kerosene; and various surface active agents.

Suitable examples of the surface active agent include an anionic surface active agent, nonionic surface active agent, cationic surface active agent, and amphoteric surface active agent. For instance, the above compounds mentioned as examples of the surface active agents can be used directly as the anionic surface active agent, nonionic surface active agent, cationic surface active agent and amphoteric surface active agent.

Moreover, a more suitable example of the surface active agent is the above-mentioned fluorochemical surface active agent. With the use of the fluorochemical surface active agent, the adhesion of the crosslinked hydrogel polymer to the rotary blade can further be reduced. The fluorochemical surface active agent for use in the present invention is not particularly limited. Namely, it is possible to use various conventionally known fluorochemical surface active agents. Suitable examples are those having perfluoroalkyl group by substituting hydrogen of the lipophilic group of a general surface active agent with fluorine, and significantly improved surface activity. Four types, i.e., anionic, nonionic, cationic and amphoteric, of surface active agents are obtained by changing the hydrophilic group of the fluorochemical surface active agent. In the case of hydrophobic group, a fluorocarbon chain having the same structure is often used. The carbon chain as the hydrophobic group may be a straight chain or branched chain.

These lubricants can be used individually or in combination of two or more kinds thereof. Considering the absorption properties of the resultant water-absorbent resin, it is preferred to use water and/or a hydrophilic organic solvent, or an aqueous liquid of surface active agent as the lubricant. According to the present invention, in order to crush (cut) the crosslinked hydrogel polymer with the crushing machine having the rotary blade, the crosslinked hydrogel polymer can be crushed into a desired size by using the lubricant, thereby simplifying and facilitating the drying of the crosslinked hydrogel polymer.

The amount of the lubricant used in the present invention is preferably within the range of from 0.01 weight part to 100 weight parts, and more preferably 0.03 weight part to 20 weight parts, based on 100 weight parts of the crosslinked hydrogel polymer. When the amount of the lubricant is smaller than 0.01 weight part, there is a possibility depending on the type of the crushing machine (cutter) that the crosslinked hydrogel polymer is kneaded during crushing (cutting) On the other hand, when the amount of the lubricant exceeds 100 weight parts, the effect corresponding to the amount is not produced, resulting poor economical efficiency.

When cutting the crosslinked hydrogel polymer with the cutter having the rotary blade, if the crosslinked hydrogel polymer is cut in a state in which the lubricant adheres to the rotary blade, the adhesion of the crosslinked hydrogel polymer to the rotary blade is extremely reduced, thereby making the cut face sharper. Consequently, the stereo-structure of the cut crosslinked hydrogel polymer is retained more precisely. It is therefore possible to reduce the deformation of the crosslinked hydrogel polymer, and cut the crosslinked hydrogel polymer without destroying its three-dimensional network. Accordingly, the crosslinked hydrogel polymer can be crushed without being kneaded during crushing while retaining a larger number of cells in the crosslinked hydrogel polymer than a conventional structure.

In the case when cutting the crosslinked hydrogel polymer without using a lubricant, the cut crosslinked hydrogel polymers often adhere (stick) to each other immediately after cutting. However, with the use of the lubricant, since the lubricant adheres to the crushed crosslinked hydrogel polymer surface, it is possible to prevent the cut crosslinked hydrogel polymers from adhering to each other. Moreover, since the crosslinked hydrogel polymer does not adhere to the rotary blade, it is possible to efficiency crush the crosslinked hydrogel polymer and reduce deterioration of the rotary blade.

The cutter (crushing machine) having the rotary blade is not particularly restricted. Namely, it is possible to use any cutter if it has a rotary blade having a curved cutting face on the rotation shaft. It is possible to use a rotary blade of any shape if it has a curved cutting face such as disk, comma and sword-shaped rotary blades. Examples of the cutter (crushing machine) having such a rotary blade include a cutting device having a guillotine type cutter such as the slicer 61 shown in FIG. 10, a cutting device having a rotary blade that circulates on a circular obit while rotating on the shaft such as the slicer 81 shown in FIG. 11, etc. as well as the cutting device having a pair of rotary blades that are mounted on different shafts and rotate while at least partly overlapping each other like the above-mentioned high-speed slit slicer 41.

In the case when the high-speed slit slicer 41 is used as the cutter (crushing machine) having the rotary blade, it is possible to adopt various methods for adhering the lubricant to the rotary blades 42a and 43a, such as a method adopting application of the lubricant to at least one of the rotary blades 42a and 43a with a sponge, blush, etc., and a method adopting spraying of the lubricant to at least one of the rotary blades 42a and 43a.

As the method adopting application of the lubricant to at least one of the rotary blades 42a and 43 with a sponge, blush, etc., for example, it is possible to use a method adopting application of the lubricant to the rotary blade 42a using a lubricant applicator 51 shown in FIG. 8.

The lubricant applicator 51 has, for example, a lubricant feed pipe 51a provided with feed openings 51b for supplying the lubricant. Moreover, blushes 5ic are hanging on the feed openings 51b, respectively. When applying the lubricant to the rotary blade 42a using the lubricant applicator 51 having the above-mentioned structure, if the lubricant applicator 51 is disposed so that the blush 51c is positioned within the rotation area of the rotary blade 42a, the rotary blade 42a comes into contact with the blush 51c whenever it rotates, thereby applying the lubricant thereto.

Meanwhile, as the method adopting spraying of the lubricant to at least one of the rotary blades 42a and 43a, for example, it is possible to employ a method using a lubricant applicator 52 shown in FIG. 9 to adhere the lubricant to the rotary blade 42a.

The lubricant applicator 52 has, for example, a lubricant feed pipe 52a provided with a plurality of holes 52b as the feed openings for supplying the lubricant and, for example, sprays a shower of the lubricant toward the rotary blade 42a from a higher position of the rotary blade 42a so as to cover the rotary blade 42a. The spraying of the lubricant may be performed continuously, or at predetermined time interval. The feed openings may be in the form of nozzle and jet out the lubricant toward the rotary blade 42a. In this case, the spraying direction of the lubricant is not particularly limited, and thus suitably determined so as to cause the lubricant to adhere efficiently to the rotary blade 42a. However, it is preferred to set the spraying direction so as to cause the lubricant to adhere to the entire surface of the rotary blade 42a. Moreover, in order to reduce the amount of the lubricant to be sprayed, it is preferred to spray the lubricant so that the lubricant adhering to parts other than the rotary blade (in this case, the parts other than the rotary blade 42a) becomes as small as possible.

Next, the following description will explain the method of crushing the crosslinked hydrogel polymer using the slicer 61 shown in FIG. 10 as the cutter (crushing machine) having the rotary blade.

The slicer 61 includes a guillotine type cutter 65 that is a comma-shaped rotary blade as the rotary blade having a curved cutting blade face in a circular box 63 placed on a machine base 62. The gyration-type cutter 65 is disposed at the center of the circular box 63, and fastened with the rotation shaft that is rotated by a drive motor 64, not shown.

Moreover, an inlet 67 for introducing the lubricant is provided on a top section of a lid 66 that is joined to the front opening section 63a of the circular box 63 so that the lid 66 can swing around the front opening section 63a. The lubricant introduced through the inlet 67 is spread in a spreading groove 68 formed in the back face of the lid 66, i.e., the contact area of the inner side of the lid 66 with the guillotine-type cutter 65 (an area facing the rotation area of the guillotine-type cutter 65 as shown by meshing in the drawing), and adheres to the guillotine-type cutter 65.

Additionally, the lid 66 is provided with an inlet 69 for introducing the crosslinked hydrogel polymer to be crushed. Besides, a discharge opening 70 for discharging the crushed crosslinked hydrogel polymer is provided in a region of the circular box 63, which faces the inlet 69. Furthermore, a transport belt 71 for transporting the crosslinked hydrogel polymer discharged from the discharge opening 70 is provided outside the discharge opening 70, i.e., outside the circular box 63. In this structure, a mass of crosslinked hydrogel polymer is introduced through the inlet 69, cut intermittently by the guillotine-type cutter 65 (for example, the cutter 65 rotating in a clockwise direction) with the lubricant adhering thereto, discharged directly through the discharge opening 70, and then transported by the transfer belt 71. According to the present invention, since the lubricant adheres to the guillotine-type cutter 65, the cut crosslinked hydrogel polymer can be discharged without being caught in the rotation of the guillotine-type cutter 65.

In the present invention, considering the drying efficiency, the size of the crushed (granulated) crosslinked hydrogel polymer is preferably within the range of from 1 to 50 mm, and more preferably from 2 to 30 mm. Therefore, the rotation speed of the guillotine-type cutter 65 and the introducing speed of the crosslinked hydrogel polymer are suitably set so that the size of the cut crosslinked hydrogel polymer is within the above-mentioned range.

In the case when crushing the crosslinked hydrogel polymer using the slicer 61, the crosslinked hydrogel polymer can be cut and formed into a desired size by introducing the crosslinked hydrogel polymer a plurality of times through the inlet 69. As described above, according to the present invention, by cutting the crosslinked hydrogel polymer to crush it into a desired size, it is possible to simplify and facilitate the drying of the crosslinked hydrogel polymer.

In the slicer 61, since the shape of the spreading groove 68 is not particularly restricted, it may be formed in any shape, for example, spiral, grid, etc. The spreading groove 68 needs to have at least a structure capable of bringing the lubricant into contact with the guillotine-type cutter 65.

Next, the following description will explain the method of crushing the crosslinked hydrogel polymer using the slicer 81 shown in FIG. 11 as the cutter (crushing machine) having the rotary blade.

The slicer 81 has a circular box 83 on a machine base 82. Mounted inside the circular box 83 is a turntable 95 that is rotated by a drive motor, not shown. A disk-shaped rotary blade 87 as the rotary blade having a curved cutting blade face is fastened at the center of the turntable 95 with a shaft 84. Moreover, shafts 85 and 86 are arranged in a straight line on the turntable 95 so that the shafts 85 and 86 face each other with the shaft 84 therebetween. The rotary blade 87 has cut sections 87a and 87b as cuts in the form of an arc of a circle around the shafts 85 and 86, respectively. The cut sections 87a and 87b are provided with disk-shaped rotary blades 88 and 89, respectively, that rotate along the cut sections 87a and 87b. The rotary blades 88 and 89 are mounted on the turntable 95, and rotate together with the rotary blade 87 as the turntable 95 is rotated. The rotary blades 88 and 89 rotate on the rotation shafts 85 and 86, respectively, in a direction opposite to the turntable 95, i.e., in a direction opposite to the rotary blade 87. More specifically, the rotary blades 88 and 89 circulate in a circular orbit as the locus of the rotary blade 87 in the same direction as the rotating direction of the rotary blade 87, i.e., the rotary blades 88 and 89 rotate around the shaft 84, while revolving on the shafts 85 and 86, respectively.

In addition, an inlet 91 for introducing the lubricant is provided at a top section of a lid (lid plate) 90 for covering the circular box 83. The lubricant introduced from the inlet 91 is spread in a spreading groove 92 formed on the back face of the lid 90, i.e., the contact area of the inner side of the lid 90 with the rotary blades 87, 88 and 89 (the area facing the rotation areas of the rotary blades 87, 88 and 89 as shown by meshing in the drawing), and adheres to the rotary blades 87, 88 and 89. The spreading groove 92 needs to have at least a structure capable of bringing the lubricant into contact with the rotary blades 87, 88 and 89. The spreading groove 92 is not particularly restricted in its shape, and may be produced in the form of spiral, grids, etc.

The lid 90 is provided with a protruding shoot 93 for introducing the crosslinked hydrogel polymer into the circular box 83 by placing the crosslinked hydrogel polymer to be crushed on the lid 90. Moreover, disposed below the rotary blades 87, 88 and 89 in the circular box 83 is a discharge belt 94 for discharging the crushed crosslinked hydrogel polymer. The discharge belt 94 protrudes toward the outside of the circular box 83. With this structure, a mass of the crosslinked hydrogel polymer is introduced from the shoot 93, cut by the rotary blades 87, 88 and 89 having the lubricant adhering thereto, and then discharged outside the circular box 83 by the discharge belt 94.

In the present invention, considering the drying efficiency, the size of the crushed (granulated) crosslinked hydrogel polymer is preferably within the range of from 1 to 50 mm, and more preferably from 2 to 30 mm. Therefore, the rotation speeds of the rotary blades 87, 88 and 89 and the introducing speed of the crosslinked hydrogel polymer are suitably set so that the size of the cut crosslinked hydrogel polymer is within the above-mentioned range. With the use of the above-mentioned slicer 81, the crosslinked hydrogel polymer introduced from the shoot 93 is crushed in a space 96 formed between the rotary blade 87 and the outer member composed of a frame 83a of the circular box 83 and discharge belt 94, and caught in a space 97 formed between the rotary blades 87 and 88 or space 98 between the rotary blades 87 and 89 by the rotations of the rotary blades 88 and 89, and crushed. Thus, the crosslinked hydrogel polymer is cut several times before discharged. However, since the lubricant adheres to the rotary blades 87, 88 and 89, the crosslinked hydrogel polymer can never be kneaded during cutting. Thus, with the use of the slicer 81, it is possible to crush the crosslinked hydrogel polymer efficiently.

Moreover, when crushing the crosslinked hydrogel polymer using the slicer 81, the crosslinked hydrogel polymer can be cut and formed into a desired size by introducing it several times from the shoot 93. According to the present invention, as described above, the crosslinked hydrogel polymer is crushed into a desired size by cutting it beforehand, thereby simplifying and facilitating the drying of the crosslinked hydrogel polymer.

In the present invention, the spaces 96, 97 and 98 are not particularly restricted, and thus can be suitably set so that the size of the cut crosslinked hydrogel polymer is within the above-mentioned range. The depth of the spaces 96, 97 and 98 correspond to the thicknesses of the rotary blades 87, 88 and 89, and usually set within the range of from 0.1 mm to 5 mm. Moreover, the widths of the spaces 96, 97 and 98, i.e., the distance between the rotary blade 87 and the frame 83a of the circular box 83, the distance between the rotary blades 87 and 88 and the distance between the rotary blades 87 and 89 are respectively set within the range of from 2 mm to 3 mm. However, the size and shape of the turntable 95 are not particularly restricted if the shafts 84, 85 and 86 can be mounted thereon.

Various crushing machines using a rotary blade have been explained. According to the present invention, as the material for the rotary blades used in the above-mentioned crushing machines (for example, the rotary crusher 31, high-speed slit slicer 41, slicer 61, slicer 81), i.e., the material for the rotary blades used in the present invention, it is possible to use carbon steel, Sweden steel, bearing steel, ceramics, spring steel, powder high-speed steel, alloy tool steel, super alloy, high-speed steel, stellite, stainless steel, ferritic, etc. These materials may be subjected to a surface-treatment before use.

Examples of the surface-treatment method of the rotary blades include carbonizing, nitriding, dichromic treatment, atomlloy treatment, redux treatment, Teflon coating, tefrock, tungsten thermal spraying, hard chrome plating, and ceramic thermal spraying.

By crushing the crosslinked hydrogel polymer using the above-mentioned crushing machines, it is possible to cut the crosslinked hydrogel polymer into a desired size while retaining the stereo-structure of the crosslinked hydrogel polymer and restraining the lowering of the cell content of the crosslinked hydrogel polymer by reducing the squashing of cells in the crosslinked hydrogel polymer during cutting as compared to a conventional method of crushing the crosslinked hydrogel polymer by a meat chopper or kneader. Consequently, it is possible to reduce both the lowering of the water absorbing capacity of water-absorbent resins and the increase in the soluble component content due to the crushing of the crosslinked hydrogel polymer.

Moreover, according to the above-mentioned methods, since the crosslinked hydrogel polymer can be continuously and efficiently crushed, the crushing efficiency and productivity can be improved compared to a conventional method adopting crushing of the crosslinked hydrogel polymer with hands using scissors. Thus, with the above-mentioned methods, it is possible to simply and industrially mass-produce water-absorbent resins with excellent absorption properties, such as water absorbing capacity, absorption rate and water absorbing capacity under applied pressure, and reduced water-soluble component content and residual monomer content.

Next, the following description will explain a method of crushing the crosslinked hydrogel polymer after freezing it.

Examples of the method of freezing the crosslinked hydrogel polymer include: a method of freezing the crosslinked hydrogel polymer by soaking the crosslinked hydrogel polymer in a refrigerant such as liquid nitrogen, liquid helium and liquid carbon dioxide; a method of freezing the crosslinked hydrogel polymer in a freezer; and a method of freezing the crosslinked hydrogel polymer by evaporation latent heat produced by evaporating the water content of the crosslinked hydrogel polymer under a vacuum atmosphere (no higher than 10 mmHg).

Meanwhile, as a method of crushing the freezed crosslinked hydrogel polymer, for example, it is possible to employ a method of crushing the crosslinked hydrogel polymer by a grinder such as a hammer mill, and a method of crushing the crosslinked hydrogel polymer by cutting it with the above-mentioned various crushing machines (cutters). When crushing the freezed crosslinked hydrogel polymer, it is preferred to crush promptly the crosslinked hydrogel polymer before it is thawed. The crushed crosslinked hydrogel polymer is dried as it is, or dried after thawing it.

When adopting the above method, considering the drying efficiency, the particle size of the crushed crosslinked hydrogel polymer is preferably within the range of from 0.1 to 30 mm, and more preferably from 1 to 15 mm. By crushing the crosslinked hydrogel polymer into such particles, it is possible to simplify and facilitate the drying of the crosslinked hydrogel polymer.

As described above, with the use of the method of crushing the crosslinked hydrogel polymer after freezing it, since the stereo-structure of the gel is retained more precisely when the crosslinked hydrogel polymer is freezed, it is possible to restrain squashing of the cells contained in the crosslinked hydrogel polymer during crushing. Thus, with this method, it is possible to produce stably a water-absorbent resin with a larger surface area, high water absorbing capacity, small soluble component content, and high absorption rate. Moreover, the water-absorbent resin produced by this method can reduce both of the lowering of the water absorbing capacity and the increase in the soluble component content due to the crushing of the crosslinked hydrogel polymer as compared to a conventional method of crushing the crosslinked hydrogel polymer by a meat chopper or kneader without freezing it. Furthermore, when the above method is adopted, the absorption properties are improved compared to those of a water-absorbent resin produced by crushing the crosslinked hydrogel polymer without freezing it. The reason for this effect is not certain, but is considered that the freezing of the crosslinked hydrogel polymer expands the volumes of water and refrigerant in the crosslinked hydrogel polymer and increases the mesh intervals of the three-dimensional network.

Besides, with the above method, since the crushing of the crosslinked hydrogel polymer is simplified compared to shearing it with scissors, it is possible to produce a water-absorbent resin with high absorption rate in a simplified and stable manner.

In the present invention, the crushed crosslinked hydrogel polymer can be made into water-absorbent resin particles through the drying and gliding step, if necessary.

As a method of drying the crosslinked hydrogel polymer, it is possible to use known drying methods such as hot-air dying, infrared drying, microwave drying, drying using a drum dryer, and azeotropic dehydration in a hydrophobic organic solvent. However, the drying method is not particularly limited to these examples. Moreover, the drying conditions can be suitably set so that the solid content of the water-absorbent resin is within a desired range. More preferably, the drying conditions are set so that the water content is not more than 10 weight percent.

Furthermore, it is possible to adjust the particle size of the resultant water-absorbent resin by grinding and granulation after drying the crosslinked hydrogel polymer. The average particle diameter of the water-absorbent resin is not particularly restricted, but is preferably within the range of from 10 to 2000 $\mu$m, more preferably from 100 to 1000 $\mu$m, and most preferably from 300 to 600 $\mu$m. A narrower particle size distribution of the water-absorbent resin is preferred. By adjusting the particle size of the water-absorbent resin within the above-mentioned range, it is possible to further improve the absorption properties. The water-absorbent resin may have various forms, such as spherical, scaly, irregular broken, and granular forms.

Additionally, it is preferred to increase the density of crosslinking in the vicinity of the surface of the water-absorbent resin particles by secondary crosslinking of the surface of the water-absorbent resin particles with a surface crosslinking agent. By treating the water-absorbent resin produced by the process of the present invention with a surface crosslinking agent, it is possible to further improve the liquid permeability, absorption rate, water absorbing capacity under applied pressure, and liquid permeability of the water-absorbent resin.

As the surface crosslinking agent, it is possible to use a compound which has a plurality of reactive groups and is reactive with the functional group such as a carboxyl group of the water-absorbent resin. Namely, it is possible to use known surface crosslinking agents that are generally used in the above-mentioned applications. More specifically, examples of such surface crosslinking agents include:

polyhydric alcohols, such as (poly)ethylene glycol, diethylene glycol, (poly)propylene glycol, triethylene glycol, tetraethylene glycol, 1,3-propanediol, dipropylene glycol, 2,2,4-trimethyl-1,3-pentanediol, (poly) glycerin, 2-butene-1,4-diol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylenene block copolymer, pentaerythritol, sorbitol, polyvinyl alcohol, glucose, mannitol, sucrose, and dextrose;

polyfunctional epoxy compounds, such as ethylene glycol diglycidyl ether, polyethylene glycol diglycidyl ether, glycerol polyglycidyl ether, diglycerol polyglycidyl ether, polyglycerol polyglycidyl ether, and (poly) propylene glycol diglycidyl ether;

polyamine compounds, such as ethylenediamine, diethylenetriamine, triethylenetetramine, tetraethylenepentamine, pentaethylenehexamine, and polyethylene imine;

polyisocyanate compounds, such as 2,4-trilene diisocyanate, and hexamethylene diisocyanate;

polyfunctional oxazoline compounds, such as 1,2-ethylenebis(oxazoline);

alkylene carbonate compounds, such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, and 1,3-dioxopan-2-one;

haloepoxy compounds, such as epichlorohydrin, epibromohydrin, and α-methylepichlorohydrin; and polyvalent metal compounds, such as hydroxides and chlorides of polyvalent metals including zinc, calcium, magnesium, aluminum, iron and zirconium. However, the surface crosslinking agent is not particularly limited to these examples. These surface cross-linking agents may be used individually, or in combination of two or more kinds thereof.

By applying the secondary crosslinking treatment to the water-absorbent resin using the surface crosslinking agent, it is possible to further improve the water absorbing capacity of the water-absorbent resin under applied pressure. Besides, it is possible to reduce the amount of components that elute in the aqueous liquid in contact with the aqueous liquid, i.e., a so-called water-soluble component content. The amount of the surface crosslinking agent, treatment temperature and treatment time are not particularly restricted, and thus can be suitably set according to the water-absorbent resin, the kinds and a combination of surface crosslinking agents, a desired degree of surface crosslinking, etc.

As described above, the process for producing water-absorbent resins of the present invention is a process for producing a water-absorbent resin by crushing and drying a crosslinked hydrogel polymer prepared by performing aqueous solution polymerization of a water-soluble ethylenically unsaturated monomer, more preferably acrylic acid and/or acrylic acid alkaline metal salt, under the presence of a crosslinking agent so as to preferably contain cells therein, and characterized by crushing the crosslinked hydrogel polymer without kneading it. Additionally, the present invention is a crushing method for restraining reduction in the number of the cells, for example, for retaining 20 or more percent of the cells.

Examples of the method of crushing the crosslinked hydrogel polymer include: a crushing method adopting shearing of the crosslinked hydrogel polymer with a fixed blade and a rotary blade; a crushing method adopting cutting of the crosslinked hydrogel polymer with a cutter having a pair of rotary blades that are mounted on different shafts and rotate while at least partly overlapping each other; a crushing method adopting cutting the crosslinked hydrogel polymer with a cutter having a rotary blade using a lubricant; and a method of crushing the crosslinked hydrogel polymer after freezing it.

According to the above methods, since the crosslinked hydrogel polymer can be crushed (cut) while reducing the deformation thereof without destroying the three-dimensional network of the crosslinked hydrogel polymer, it is possible to produce water-absorbent resins with excellent absorption properties such as water absorbing capacity, absorption rate, and water absorbing capacity under applied pressure, and reduced water-soluble component content and residual monomer content.

Moreover, according to the above-mentioned methods, since the crosslinked hydrogel polymer can be continuously and efficiently crushed, the crushing efficiently can be improved compared to a conventional method adopting crushing of the crosslinked hydrogel polymer with hands using scissors, thereby increasing the productivity. Thus, with the above-mentioned methods, it is possible to simply and industrially mass-produce water-absorbent resins with excellent absorption properties and reduced water-soluble component content and residual monomer content.

Furthermore, by applying a secondary crosslinking treatment in the vicinity of the surface of the particulate matter obtained by crushing the crosslinked hydrogel polymer, it is possible to produce water-absorbent resins with further improved water absorbing capacity under applied pressure and a reduced amount of component that elutes in contact with an aqueous liquid, i.e., reduced water-soluble component content, and a reduced residual monomer content by the secondary crosslinking treatment.

In particular, when the crosslinked hydrogel polymer contains cells therein, it is possible to restrain the destroy of a large number of cells (pores) formed all over the inside of the crosslinked hydrogel polymer, thereby retaining the cells in the crosslinked hydrogel polymer. Thus, a porous water-absorbent resin can be obtained by performing drying, and grinding if necessary. Accordingly, with the process of the present invention, since a water-absorbent resin having a high cell content and greater surface area can be obtained, it is possible to achieve higher water absorbing capacity and absorption rate.

The water-absorbent resins produced by the process of the present invention have a large number of cells (pores) all over the inside thereof as shown in, for example, FIG. 1(a) to FIG. 3. FIGS. 1(a) and 1(b) are depictions showing the particle structure of a water-absorbent resin produced by crushing a crosslinked hydrogel polymer containing the cells after freezing it.

FIG. 2 is a scanning electron photomicrograph of the particle structure shown in FIGS. 1(a) and 1(b). FIG. 3 is a scanning electron photomicrograph of the particle structure of a water-absorbent resin produced by crushing a crosslinked hydrogel polymer containing the cells by shearing it with a fixed blade and a rotary blade.

As shown in FIGS. 1(a) and 1(b), the water-absorbent resin produced by the process of the present invention is porous and includes a large number of cells (pores) 20a therein. Therefore, the water-absorbent resin 20 containing the cells (pores) 20a has sufficient liquid guide spaces necessary for the movement of the aqueous liquid under no pressure and applied pressure. Hence, the water-absorbent resin has excellent liquid permeability and dispersibility of the aqueous liquid, thereby exhibiting improved absorption rate and water retention ability because of the capillarity phenomenon.

The water-absorbent resins produced by the process of the present invention have excellent absorption properties, and thus can be suitably used in various applications, for example: sanitary materials (body exudates absorbent articles) such as paper diapers, sanitary napkins, incontinence pads, wound protecting material and wound healing material; absorbent articles for absorbing urine of pets; materials for construction and building, such as water retentive material for building material and soil, waterproof material, packing material, and gel water bag; materials for food, such as drip absorbing material, freshness retentive material, and heat insulating material; various industrial articles, such as oil and water separating material, dew condensation preventing material, and coagulant; and agricultural and horticultural articles, such as water retentive material for plant and soil.

For a fuller understanding of the nature and advantages of the invention, reference should be made to the ensuing detailed description taken in conjunction with the accompanying drawings.

BEST MODE FOR CARRYING OUT THE INVENTION

Figure 1A:
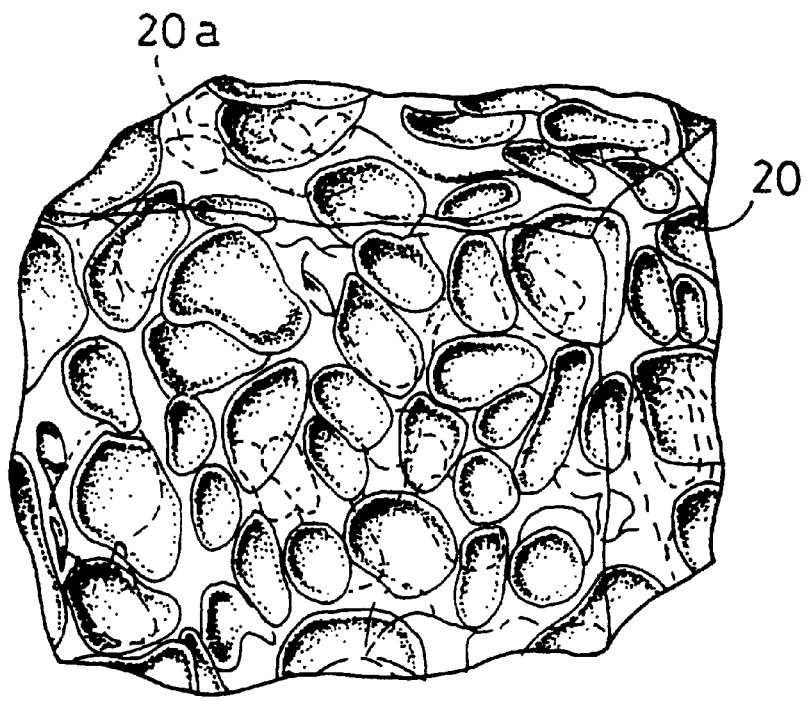
FIG. 1(a) is a perspective view as a depiction, showing the particle structure of a water-absorbent resin produced by a process for producing a water-absorbent resin of the present invention.

The following examples and comparative examples are presented to explain the present invention in greater detail, but not to limit the present invention. The properties of water-absorbent resins were measured according to the following methods. In the following description, "part" recited in Examples and Comparative Examples refers to "weight part" unless otherwise specified.

(a) Water Absorbing Capacity under No Pressure

About 0.2 grams of a water-absorbent resin was accurately weighed and placed in a 5 cm square tea bag made of non-woven fabric. Then, the tea bag was sealed by heat sealing. Next, the tea bag was dipped in a synthetic urine at room temperature. 1 hour later, the tea bag was removed from the synthetic urine and a liquid component was centrifuged at 1,300 rpm (equivalent to 250 G) for three minutes using a centrifugal separator. Then, the weight $W_1$ (g) of the tea bag was measured. The same test was performed using a blank tea bag, i.e., a tea bag containing no water-absorbent resin, and the weight $W_0$ (g) of the blank tea bag was measured. The water absorbing capacity (g/g) was given by the following equation.

$$\text{Water absorbing capacity (g/g)} = \frac{(W_1 \text{ (g)} - W_0 \text{ (g)} - \text{water-absorbent resin weight (g)})}{\text{water-absorbent resin weight (g)}}$$

The composition of the synthetic urine and the contents of the respective compounds are as follows.

| Composition of synthetic urine | Contents of compounds |
|---|---|
| Sodium sulfate | 0.200% |
| Potassium chloride | 0.200% |
| Magnesium chloride hexahydrate | 0.050% |
| Calcium chloride dihydrate | 0.025% |
| Ammonium dihydrogen phosphate | 0.035% |
| Diammonium hydrogenphosphate | 0.015% |
| Deionized water | 99.475% |

(b) Water-soluble Component Content 0.5 grams of the water-absorbent resin was dispersed in 1,000 ml of deionized water, agitated for 16 hours, and filtered with a filter paper. The water-soluble component content (%) was found by colloid-titrating the resultant filtrate using a cationic colloid reagent and measuring the amount of colloid of the water-absorbent resin dispersed in the filtrate.

(c) Residual Monomer Content

After placing 100 ml of deionized water in a 200 ml beaker, 1.0 gram of the water-absorbent resin was added while agitating the deionized water so as to completely gelate the deionized water. One hour later, 5 ml of an aqueous phosphoric acid solution was added to the resultant gel so as to condensate the gel. The condensed gel was filtered with a filter paper while agitating the gel, and the resultant filtrate, i.e., water produced by condensation, was analyzed using a high-performance (high-speed) liquid chromatography.

Similarly, an aqueous monomer solution with a known concentration was analyzed as a standard solution to obtain a calibration curve. By setting the calibration curve as an external standard, the residual monomer content (ppm) of the water-absorbent resin was calculated by considering the degree of dilution of the filtrate. Here, the residual monomer content is given by a reduced value with respect to the solid component of the water-absorbent resin.

(d) Absorption Rate 1.0 gram of the water-absorbent resin composition was placed in a polypropylene cylindrical cup having an internal diameter of 50 mm and a height of 70 mm. Subsequently, 28 grams of physiologic saline was poured into the cup so that the water-absorbent resin absorbed the physiologic saline evenly. The time taken for reaching a state in which the physiologic saline was completely gelated and absorbed by the water-absorbent resin and became unseen from the pouring of the physiologic saline was measured. The measurement was performed three times, and the average value was taken as the absorption rate (second). In Examples 6 to 9 and Comparative Examples 7 and 8, 20 grams of the above-mentioned synthetic urine was used instead of the physiologic saline.

(e) Water Absorbing Capacity Under Applied Pressure

A measuring device for use in measuring the water absorbing capacity under applied pressure will be briefly explained below with reference to FIG. 12.

Figure 12:
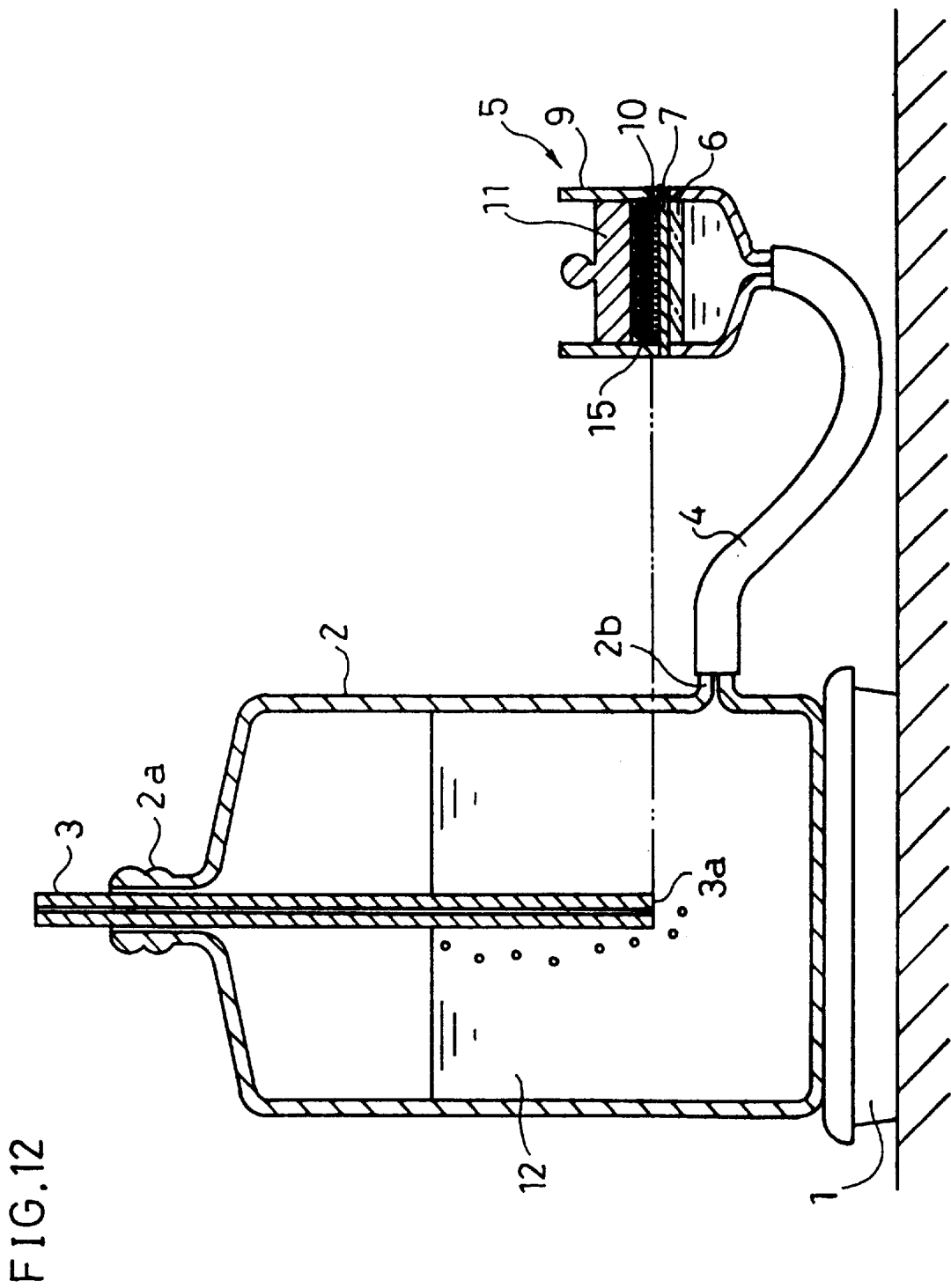
FIG. 12 is a schematic cross section of a measuring apparatus used for measuring the water absorbing capacity under applied pressure as one of the properties of the water-absorbent resins of the present invention.

As illustrated in FIG. 12, the measuring device includes a scale 1, a container 2 of a predetermined capacity placed on the scale 1, an outside air inlet pipe 3, a conduit 4 made of a silicon resin, a glass filter 6, and a measuring section 5 disposed on the glass filter 6. The container 2 has openings 2a and 2b at the top and the side face thereof, respectively. The outside air inlet pipe 3 is fitted into the opening 2a, while the conduit 4 is connected to the opening 2b.

Moreover, the container 2 contains a predetermined amount of synthetic urine 12. The bottom end of the outside air inlet pipe 3 is in the synthetic urine 12. The outside air inlet pipe 3 is provided so as to control the pressure in the container 2 to be substantially equal to atmospheric pressure. The glass filter 6 has a diameter of 55 mm. The container 2 and glass filter 6 are connected to each other with the conduit 4. Additionally, the position and height of the glass filter 6 with respect to the container 2 are fixed.

The measuring section 5 includes a filter paper 7, supporting cylinder 9, a metal gauge 10 fastened to the bottom of the supporting cylinder 9, and a weight 11. More specifically, in the measuring section 5, the filter paper 7 and supporting cylinder 9 (i.e., metal gauge 10) are disposed in this order on the glass filter 6, and the weight 11 is placed in the supporting cylinder 9, i.e., on the metal gauge 10. The metal gauge 10 is made of stainless steel to have 400 mesh (a mesh size of 38 $\mu$m). It is designed that a predetermined amount of a water-absorbent resin 15 having a predetermined particle diameter is evenly spread over the metal gauge 10 during measuring. In addition, it is arranged that the height of the top face of the metal gauge 10, i.e., the contact surface between the metal gauge 10 and the water-absorbent resin 15, is equal to the height of a lower end 3a of the outside air inlet pipe 3. The weight of the weight 11 is adjusted so that a load of 50 g/cm$^2$ is evenly applied to the metal gauge 10, i.e., to the water-absorbent resin 15.

The water absorbing capacity under applied pressure was measured using a measuring device of the above-mentioned structure. The following description will explain the measuring method.

First, prescribed preparations were made. Namely, a predetermined amount of the synthetic urine 12 was placed in the container 2, and the outside air inlet pipe 3 was fitted into the container 2. Next, the filter paper 7 was placed on the glass filter 6. At the same time as placing the filter paper 7 on the glass filter 6, 0.9 grams of the water-absorbent resin 15 was evenly spread inside the supporting cylinder 9, i.e., over the metal gauge 10, and the weight 11 was then placed on the water-absorbent resin 15.

Subsequently, the metal gauge 10, i.e., the supporting cylinder 9 whereupon the water-absorbent resin 15 and the weight 11 were placed, was placed on the filter paper 7 so that the center of the metal gauge 10 coincides with the center of the glass filter 6.

Next, weight $W_2$ (g) of the synthetic urine 12 absorbed by the water-absorbent resin 15 was measured using the scale 1 with the passage of time for 60 minutes after the placement of the supporting cylinder 9 on the filter paper 7. The same process was performed without using the water-absorbent resin 15, and the weight, i.e., the weight of synthetic urine 12 absorbed by members other than the water-absorbent resin 15, for example, the filter paper 7, was measured as blank weight $W_3$ (g) with the scale 1. The water absorbing capacity (g/g) under applied pressure was calculated from the weights $W_2$ and $W_3$ according to the following equation.

Water absorbing capacity (g/g) under applied pressure= ($W_2$ (g)–$W_3$ (g))/water-absorbent resin weight(g)

(f) Particle Area, Pore Area, Pore Area Ratio, and Cell Retention Capacity

The particles of a water-absorbent resin resulting from drying and grinding the crushed crosslinked hydrogel polymer were photographed using a scanning electron microscope (SEM) with a magnification of 25. Subsequently, the ratio of the area of pores to the particle surface was calculated from the area of the particles and the area of pores in the particle surface in the SEM photograph. Water-absorbent resins were prepared using the above-mentioned methods of crushing the crosslinked hydrogel polymer. By comparing the water-absorbent resins in terms of the pore area ratio, the cell retention ratio of the crosslinked hydrogel polymers were indirectly evaluated.

More specifically, it was assumed that the particle of the water-absorbent resin and the pore in the particle surface shown in the SEM photograph were elliptical, and the long and short diameters of the particle and pore in the particle surface were measured by a slide caliper. The particle area, pore area, pore area ratio, and pore retention capacity of the water-absorbent resin were given by the following equations.

Particle area ($\mu$m$^2$)

= $\pi$/4 (particle's long diameter/magnification of photograph) × (particle's short diameter/magnification of photograph)

Pore area ($\mu$m$^2$)

= $\pi$/4 (pore's long diameter/magnification of photograph) × (pore's short diameter/magnification of photograph)

Pore area ratio (%)

= $\Sigma$ (area of pores in particle surface)/$\Sigma$ (particle area) × 100

Cell retention capacity (%)

= (pore area ratio)/(pore area ratio when crushed with scissors) × 100

Example 1

An aqueous monomer solution was prepared by mixing 83.2 parts of an acrylic acid, 1662.8 parts of an aqueous 37 weight % sodium acrylate solution, 5.5 parts of polyethylene glycol diacrylate (an average ethylene oxide (EO) added mol number of 8), and 654.5 parts of deionized water. The neutralization ratio of the acrylic acid in the aqueous monomer solution was 85%, and the monomer concentration was 30%.

Next, dissolved oxygen was removed from the aqueous monomer solution by blowing a nitrogen gas into the aqueous monomer solution while maintaining the temperature of the aqueous monomer solution at 24° C. Thereafter, 77 parts of an aqueous 10 weight percent 2,2'-azobis(2-methylpropionamidine)dihydrochloride solution was added while agitating the aqueous monomer solution.

When 3 minutes passed from the initiation of agitation, the aqueous monomer solution containing the 2,2'-azobis(2-methylpropionamidine)dihydrochloride appeared cloudy and white, and a white particulate solid with an average particle diameter of about 9 $\mu$m was generated. The particulate solid was 2,2'-azobis(2-methylpropionamidine) diacrylate as a blowing agent.

When 5 minutes passed from the initiation of agitation, 10.8 parts of aqueous 10 weight percent sodium persulfate solution and 0.5 part of aqueous 1 weight percent L-ascorbic acid solution were added as a radical polymerization initiator while agitating the aqueous monomer solution under the nitrogen atmosphere. After sufficiently agitating the aqueous monomer solution, it was left at rest.

When 3 minutes passed from the addition of the aqueous 10 weight percent sodium persulfate solution and aqueous 1 weight percent L-ascorbic acid solution, polymerization was started. The polymerization was carried out in a hot water bath while controlling the temperature of the hot water bath to follow the increase in the temperature of the aqueous monomer solution. When 26 minutes passed from the addition of the aqueous 10 weight percent sodium persulfate solution to the aqueous monomer solution, the temperature of the aqueous monomer solution reached 97° C. Thereafter, the aqueous monomer solution was left at rest for further 20 minutes while keeping the temperature thereof within the range of from 70° C. to 90° C., so that the polymerization reaction of the acrylic acid salt monomer was completed. As a result, a crosslinked hydrogel polymer having cells as a porous crosslinked polymer (hereinafter referred to as the "hydrogel (A)") was obtained.

Figure 4:
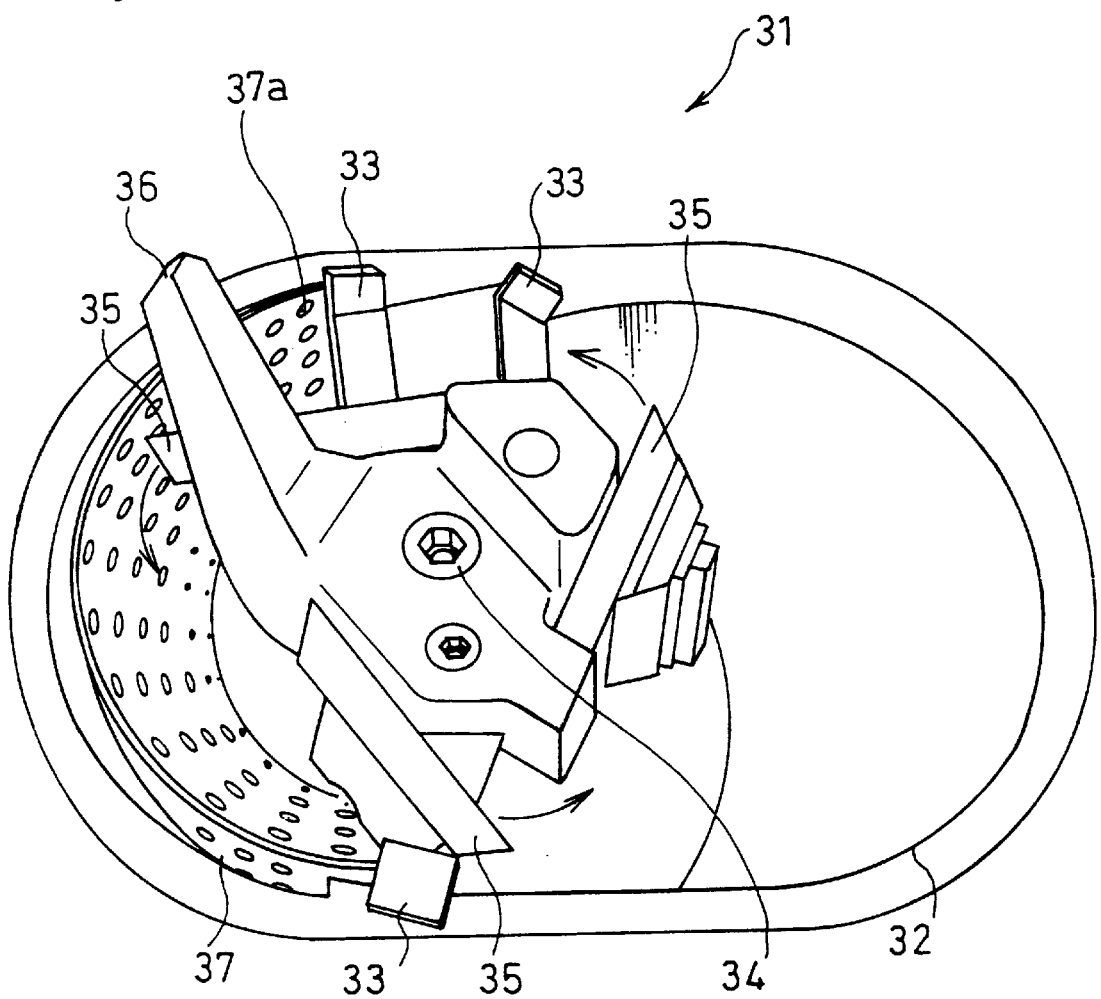
FIG. 4 is a schematic view of a crushing machine for use in the process for producing water-absorbent resins of the present invention.

The resultant hydrogel (A) was continuously crushed by a rotary crusher 31 shown in FIG. 4. The average residence time of the hydrogel (A) in the rotary crusher 31 during crushing, i.e., the crushing time, was about 0.25 minute. A hydrogel particle obtained by crushing the hydrogel (A) had a diameter ranging from about 1 mm to 15 mm.

The crushed hydrogel was dried at 160° C. for 1 hour using a circulating type hot-air dryer. Subsequently, the dried hydrogel was ground by a roll mill, and sieved using standard screens according to JIS standards. Particles that passed a 850-$\mu$m mesh screen but did not pass a 150-$\mu$m mesh screen were obtained as a water-absorbent resin (1) of the present invention. The results of measuring the properties of the water-absorbent resin (1) are shown in Table 1.

Figure 1B:
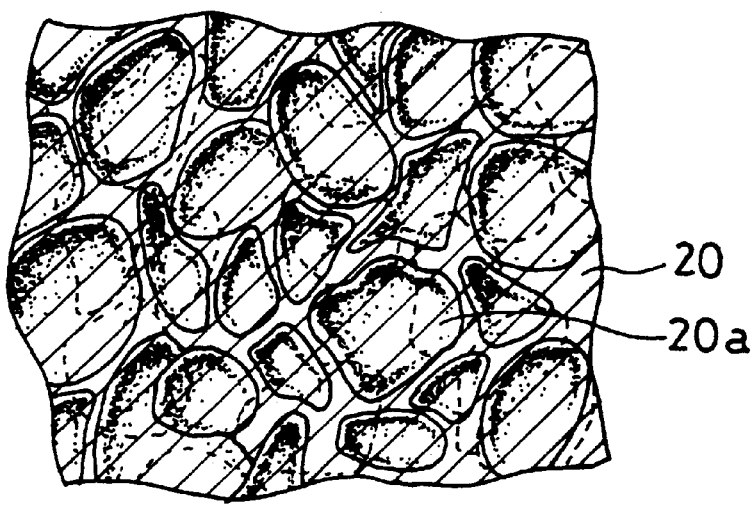
FIG. 1(b) is a cross section as a depiction of the particle structure of the water-absorbent resin shown in FIG. 1(a).
Figure 2:
FIG. 2 is a (25 times magnified) electron photomicrograph (as a substitute for drawing) showing the particle structure of the water-absorbent resin of FIG. 1(a).
Figure 3:
FIG. 3 is a (25 times magnified) electron photomicrograph (as a substitute for drawing) showing the particle structure of another water-absorbent resin produced by the process for producing water-absorbent resins of the present invention.

Moreover, an SEM photograph of the water-absorbent resin (1) was taken with a magnification ratio of 25, and the particles and the long and short diameters of pores in the particle surface were measured by a slide caliper. The particle area, the pore area, the pore area ratio, and the retention ratio were calculated based on the results of the measurements. The SEM photograph of the water-absorbent resin (1) and the results of the measurements are shown in FIG. 1 and Table 2, respectively.

Comparative Example 1

By performing the same operation and reaction as in Example 1, the hydrogel (A) having cells was obtained. Then, a comparative water-absorbent resin (2) was prepared through the same process as in Example 1, except that the hydrogel (A) was crushed using a meat chopper having a grate with a diameter of 8 mm. It took about 5 minutes to crush the hydrogel (A). Table 1 shows the results of measuring the properties of the water-absorbent resin (2).

Figure 13:
FIG. 13 is a (25 times magnified) electron photomicrograph (as a substitute for drawing) showing the particle structure of a comparative water-absorbent resin described in Comparative Example 1.

Furthermore, the particle area, pore area, pore area ratio, and retention ratio of the water-absorbent resin (2) were calculated in the same manner as in Example 1. The SEM photograph of the water-absorbent resin (2) and the results of the measurements are shown in FIG. 13 and Table 2, respectively.

Comparative Example 2

The hydrogel (A) having cells was obtained by performing the same operation and reaction as in Example 1. Then, a comparative water-absorbent resin (3) was prepared through the same process as in Example 1, except that the hydrogel (A) was crushed by chopping it with hands using scissors so that the particle diameter of the crushed hydrogel was within the range of from about 1 mm to 5 mm. It took about 30 minutes to crush the hydrogel (A). Table 1 shows the results of measuring the properties of the water-absorbent resin (3).

Figure 14:
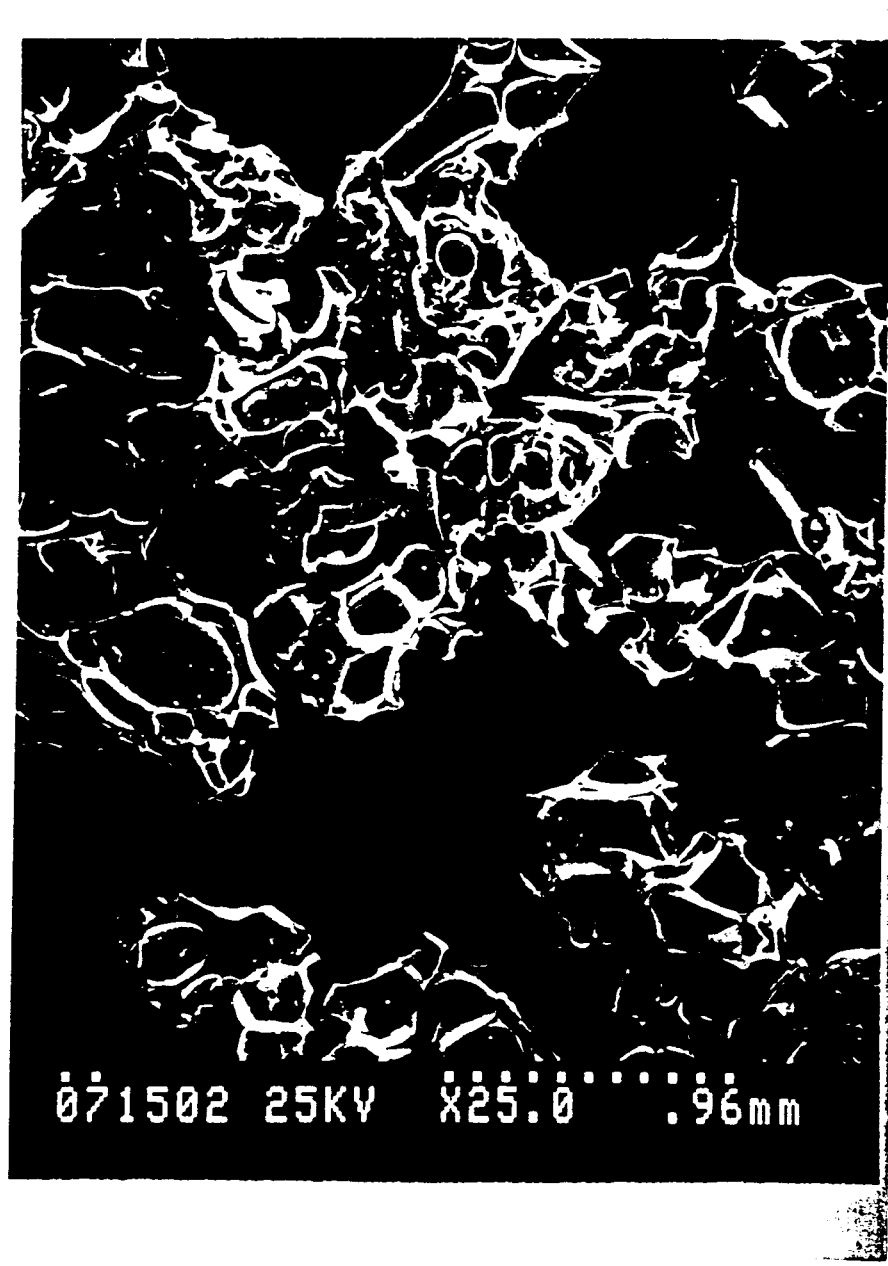
FIG. 14 is a (25 times magnified) electron photomicrograph (as a substitute for drawing) showing the particle structure of a comparative water-absorbent resin described in Comparative Example 2.

Furthermore, the particle area, pore area, pore area ratio, and retention ratio of the water-absorbent resin (3) were calculated in the same manner as in Example 1. The SEM photograph of the water-absorbent resin (3) and the results of the measurements are shown in FIG. 14 and Table 2, respectively.

TABLE 1

|  | Example 1 | Comparative Example 1 | Comparative Example 2 |
|---|---|---|---|
| Water absorbing capacity under no pressure (g/g) | 45.5 | 44.9 | 45.2 |
| Water-soluble component content (%) | 8.2 | 10.2 | 8.6 |
| Residual monomer content (ppm) | 180 | 185 | 190 |
| Absorption rate (second) | 34 | 140 | 35 |
| Water absorbing capacity under applied pressure (g/g) | 12 | 10 | 12 |
| Crushing time (minute) | 0.25 | 5 | 30 |

TABLE 2

| Crushing method | Example 1 Rotary crusher | Example 1 Meat chopper | Comparative Comparative Example 2 Scissors |
|---|---|---|---|
| Average particle area ($\mu m^2$) | 185276 | 161924 | 248534 |
| Number of particles (piece) | 32 | 35 | 24 |
| Average pore area ($\mu m^2$) | 17709 | 8632 | 21479 |
| Number of pores (piece) | 52 | 52 | 124 |
| Ratio of pore area (%) | 16 | 8 | 45 |
| Cell retention ratio (%) | 35 | 18 | 100 |

Example 2

An aqueous monomer solution was prepared by mixing 27 parts of an acrylic acid, 285 parts of an aqueous 37 weight percent sodium acrylate solution, 1.1 parts of polyethylene glycol diacrylate (with average EO addition mol number of 8), and 117.6 parts of deionized water. The neutralization ratio of the acrylic acid and the monomer concentration in the aqueous monomer solution were 75 percent and 31 percent, respectively.

Next, by bubbling a nitrogen gas into the aqueous monomer solution while keeping the temperature of the aqueous monomer solution at 16° C., dissolved oxygen was removed from the aqueous monomer solution. Subsequently, 8.9 parts of an aqueous 1 weight percent polyoxyethylene sorbitan monostearate as a surface active agent with a hydrophile-lipophile balance (HLB) of 14.9 was added to the aqueous monomer solution while agitating the aqueous monomer solution.

Thereafter, 2.1 parts of an aqueous 10 weight percent sodium persulfate solution as a radical polymerization initiator and 0.1 part of an aqueous 1 weight percent L-ascorbic acid solution were added to the aqueous monomer solution while agitating it under a nitrogen atmosphere. After sufficiently agitating the aqueous monomer solution, it was left at rest.

4 minutes later from the addition of the aqueous 10 weight percent sodium persulfate solution and aqueous 1 weight percent L-ascorbic acid solution to the aqueous monomer solution, the aqueous solution appeared cloudy and white, and polymerization was initiated. At this time, 1.8 parts of sodium carbonate in the form of fine powder was added to and dispersed in the aqueous monomer solution. The polymerization was carried out in a hot water bath while controlling the temperature of the hot water bath to follow the increase in the temperature of the aqueous monomer solution. When 37 minutes passed from the addition of the 10 weight percent sodium persulfate to the aqueous monomer solution, the temperature of the aqueous monomer solution reached about 93° C.

Thereafter, the aqueous monomer solution was left at rest for further 20 minutes while keeping the temperature thereof within the range of from 70° C. to 90° C., so that polymerization of the acrylate monomer was completed. As a result, a crosslinked hydrogel polymer having cells as a porous crosslinked polymer (hereinafter referred to as the "hydrogel (B)") was obtained.

Next, the hydrogel (B) was continuously crushed by the same rotary crusher 31 as that used in Example 1. The average residence time of the hydrogel (B) in the rotating crusher 31 during crushing, i.e., the crushing time, was about 0.16 minute. A hydrogel particle obtained by crushing the hydrogel (B) had a diameter ranging from about 2 mm to 15 mm.

The crushed hydrogel was dried at 160° C. for 1 hour using a circulating type hot-air dryer. Subsequently, the dried hydrogel was ground by a roll mill, and sieved using standard screens according to JIS standards. Particles that passed a 850-$\mu$m mesh screen but did not pass a 150-$\mu$m mesh screen were obtained as a water-absorbent resin (4) of the present invention. The results of measuring the properties of the water-absorbent resin (4) are shown in Table 3.

Comparative Example 3

By performing the same operation and reaction as in Example 2, the hydrogel (B) having cells was obtained. Then, a comparative water-absorbent resin (5) was prepared through the same process as in Example 2, except that the hydrogel (B) was crushed using a meat chopper having a grate with a diameter of 8 mm. It took about 4 minutes to crush the hydrogel (B). Table 3 shows the results of measuring the properties of the water-absorbent resin (5).

Comparative Example 4

A hydrogel (B) having cells was obtained by performing the same operation and reaction as in Example 2. Then, a comparative water-absorbent resin (6) was prepared through the same process as in Example 2, except that the hydrogel (B) was crushed by chopping it with hands using scissors so that the particle diameter of the crushed hydrogel (B) was within the range of from about 1 mm to 5 mm. It took about 30 minutes to crush the hydrogel (B). Table 3 shows the results of measuring the properties of the water-absorbent resin (6)

TABLE 3

|  | Example 2 | Comparative Example 3 | Comparative Example 4 |
|---|---|---|---|
| Water absorbing capacity under no pressure (g/g) | 43.2 | 40.1 | 40.0 |
| Water-soluble component content (%) | 6.4 | 7.8 | 6.6 |
| Residual monomer content (ppm) | 280 | 270 | 285 |
| Absorption rate (second) | 40 | 135 | 36 |
| Water absorbing capacity under applied pressure (g/g) | 9 | 9 | 9 |
| Crushing time (minute) | 0.16 | 4 | 30 |

Example 3

A water-absorbent resin (7) of the present invention was produced by applying a secondary cross-linking treatment to the water-absorbent resin (1) obtained in Example 1. Specifically, the water-absorbent resin (7) was obtained by mixing 100 parts of the water-absorbent resin (1) and a treatment liquid for the secondary crosslinking treatment, and heating the resultant mixture at 195° C. for 30 minutes. The treatment liquid for the secondary crosslinking treatment was prepared by mixing 0.05 part of ethylene glycol diglycidyl ether, 0.5 part of lactic acid, 0.02 part of polyoxyethylene sorbitan monostearate, 0.75 part of isopropyl alcohol, and 3 parts of water. The results of measuring the properties of the water-absorbent resin (7) are shown in Table 4.

Example 4

A water-absorbent resin (8) of the present invention was produced by applying a secondary cross-linking treatment to the water-absorbent resin (4) obtained in Example 2. Specifically, the water-absorbent resin (8) was obtained by mixing 100 parts of the water-absorbent resin (4) and a treatment liquid for the secondary crosslinking treatment, and heating the resultant mixture at 195° C. for 30 minutes. The treatment liquid for the secondary crosslinking treatment was prepared by mixing 1 part of glycerin, 1.75 parts of ethyl alcohol, and 3 parts of water. The results of measuring the properties of the water-absorbent resin (8) are shown in Table 4.

TABLE 4

|  | Example 3 | Example 4 |
|---|---|---|
| Water absorbing capacity under no pressure (g/g) | 40.0 | 39.1 |
| Water-soluble component content (%) | 8.5 | 6.4 |
| Residual monomer content (ppm) | 140 | 280 |
| Absorption rate (second) | 35 | 39 |
| Water absorbing capacity under applied pressure (g/g) | 32 | 28 |
| Crushing time (minute) | 0.25 | 0.16 |

Example 5

An aqueous monomer solution was prepared by mixing 27.0 parts of acrylic acid, 285.0 parts of an aqueous 37 weight percent sodium acrylate solution, 1.1 parts of polyethylene glycol diacrylate (an average ethylene oxide (EO) added mol number of 8), and 0.013 part of cationic fluorochemical surface active agent ("Fluorad FC-135" available from Sumitomo 3M Ltd.), and 117.6 parts of deionized water.

Next, in order to disperse cells of nitrogen in the aqueous monomer solution, dissolved oxygen was removed from the aqueous monomer solution by blowing a nitrogen gas into the aqueous monomer solution while strongly agitating the solution at a high speed (3,000 rpm) by a high-speed homodisper. When the nitrogen gas was evenly dispersed in the aqueous monomer solution and the volume thereof became 1.25 times of the original volume, 2.1 parts of an aqueous 10 weight percent sodium persulfate solution and 2.1 parts of an aqueous 10 weight percent sodium hydrogensulfite solution were added under strong agitation so as to initiate polymerization immediately. In a state in which the cells were dispersed in the aqueous monomer solution, stand polymerization was carried out for 2 hours while maintaining the temperature of the aqueous monomer solution within the range of from 25° C. to 75° C. As a result, a crosslinked hydrogel polymer having cells dispersed therein (hereinafter referred to as the "hydrogel (C)") was obtained.

Next, the resultant hydrogel (C) was continuously crushed by the same rotary crusher 31 as used in Example 1. The average residence time of the hydrogel (C) in the rotary crusher 31 during crushing, i.e., the crushing time, was about 0.16 minute. A hydrogel particle obtained by crushing the hydrogel (C) had a diameter ranging from about 2 mm to 15 mm.

The crushed hydrogel was dried at 160° C. for 1 hour using a circulating type hot-air dryer. Subsequently, the dried hydrogel was ground by a roll mill, and sieved using standard screens according to JIS standards. Particles that passed a 850-µm mesh screen but did not pass a 150-µm mesh screen were obtained as a water-absorbent resin (9) of the present invention. The results of measuring the properties of the water-absorbent resin (9) are shown in Table 5.

Comparative Example 5

By performing the same operation and reaction as in Example 5, the hydrogel (C) having cells was obtained. Then, a comparative water-absorbent resin (10) was prepared through the same process as in Example 5, except that the hydrogel (C) was crushed using a meat chopper having a grate with a diameter of 8 mm. It took about 5 minutes to crush the hydrogel (C). Table 5 shows the results of measuring the properties of the water-absorbent resin (10).

Comparative Example 6

By performing the same operation and reaction as in Example 5, the hydrogel (C) having cells was obtained. Then, a comparative water-absorbent resin (11) was prepared through the same process as in Example 5, except that the hydrogel (C) was crushed by chopping it with hands using scissors so that the particle diameter of the crushed hydrogel was within the range of from about 1 mm to 5 mm. It took about 30 minutes to crush the hydrogel (C). Table 5 shows the results of measuring the properties of the water-absorbent resin (11).

TABLE 5

|  | Example 5 | Comparative Example 5 | Comparative Example 6 |
|---|---|---|---|
| Water absorbing capacity under no pressure (g/g) | 48.0 | 48.1 | 47.5 |
| Water-soluble component content (%) | 8.0 | 8.9 | 8.0 |
| Residual monomer content (ppm) | 250 | 300 | 260 |
| Absorption rate (second) | 28 | 70 | 30 |
| Water absorbing capacity under applied pressure (g/g) | 9 | 8 | 9 |
| Crushing time (minute) | 0.16 | 5 | 30 |

It is clear from the results of Examples 1 to 5 that the water-absorbent resins obtained by a process of the present invention include sufficient cells, and thus have excellent water absorbing properties such as the water absorbing capacity under no pressure, absorption rate and water absorbing capacity under applied pressure, and reduced water-soluble component content and residual monomer content. Moreover, according to the processes of Example 1 to 5, it is possible to significantly reduce the crushing time and simplify the crushing operation as compared to the processes of the comparative examples, thereby permitting industrial production of water-absorbent resins.

Example 6

An aqueous monomer solution was prepared by mixing 305 parts of an acrylic acid, 3229.5 parts of an aqueous 37 weight percent sodium acrylate solution, 8.3 parts of polyethylene glycol diacrylate (an average ethylene oxide (EO) added mol number of 8), and 0.3 part of polyoxyethylene sorbitan monostearate ("Rheodol TW-S120" available from Kao Corporation), and 1363 parts of deionized water.

Next, dissolved oxygen was removed from the aqueous monomer solution by blowing a nitrogen gas into the aqueous monomer solution. Thereafter, 12.7 parts of an aqueous 10 weight percent sodium persulfate solution, 25.4 parts of an aqueous 10 weight percent 2,2'-azobis (amidinopropane) dihydrochloride solution, and 17.8 parts of an aqueous 1 weight percent L-ascorbic acid solution were added while agitating the aqueous monomer solution.

Subsequently, the aqueous monomer solution and nitrogen were mixed in liquid phase using a Whip Auto Z available from Aikosha Seisakusho K.K., and cells of nitrogen gas were dispersed in the aqueous monomer solution. Then, polymerization was immediately started by adding 38 parts of an aqueous 0.1 weight percent hydrogen peroxide solution to the aqueous monomer mixture in a state in which the cells were dispersed in the aqueous monomer solution. Subsequently, in the state in which the cells were dispersed in the aqueous monomer solution, stand polymerization was carried out for 1 hour while maintaining the temperature of the aqueous monomer solution within the range of from 25° C. and 95° C. As a result, a sponge-like crosslinked hydrogel polymer containing a large number of cells therein (hereinafter referred to as the "hydrogel (D)") was obtained.

Figure 5:
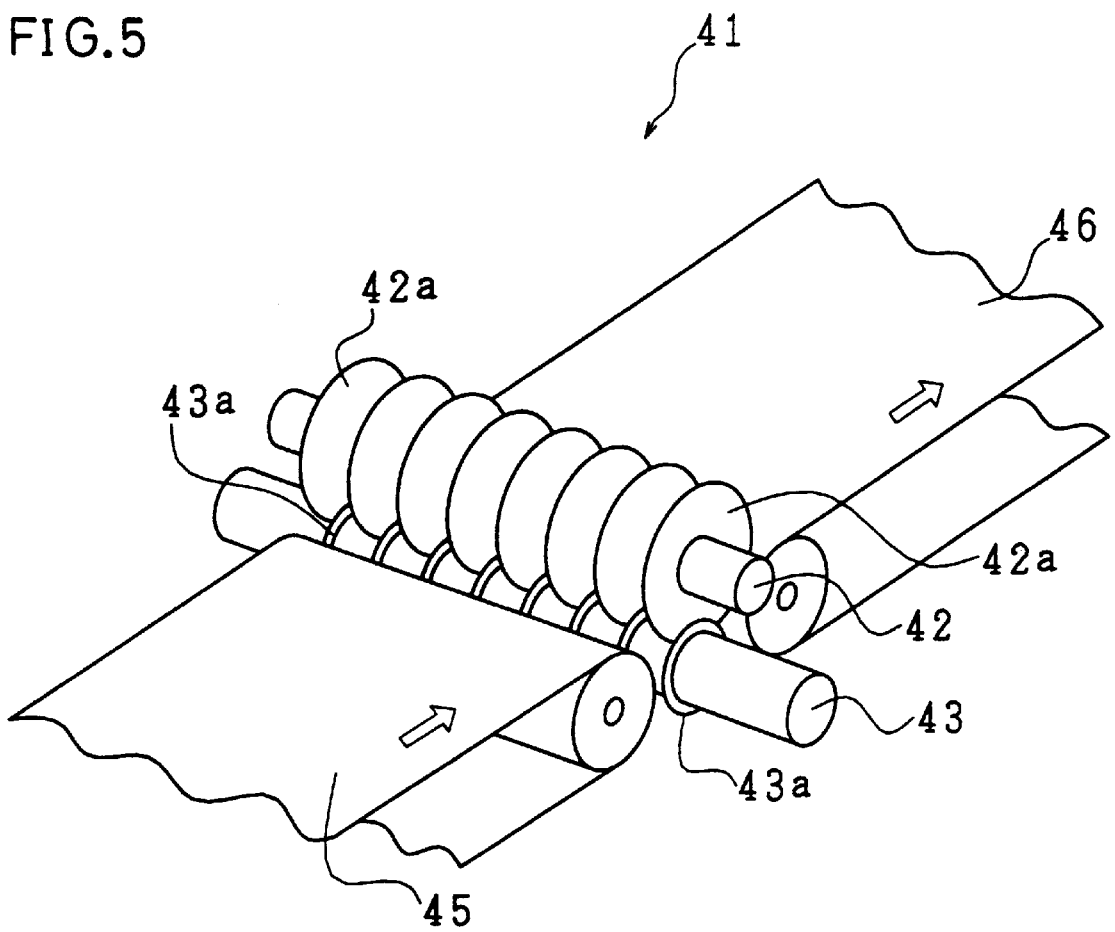
FIG. 5 is a schematic view of another crushing machine for use in the process for producing water-absorbent resins of the present invention.
Figure 6:
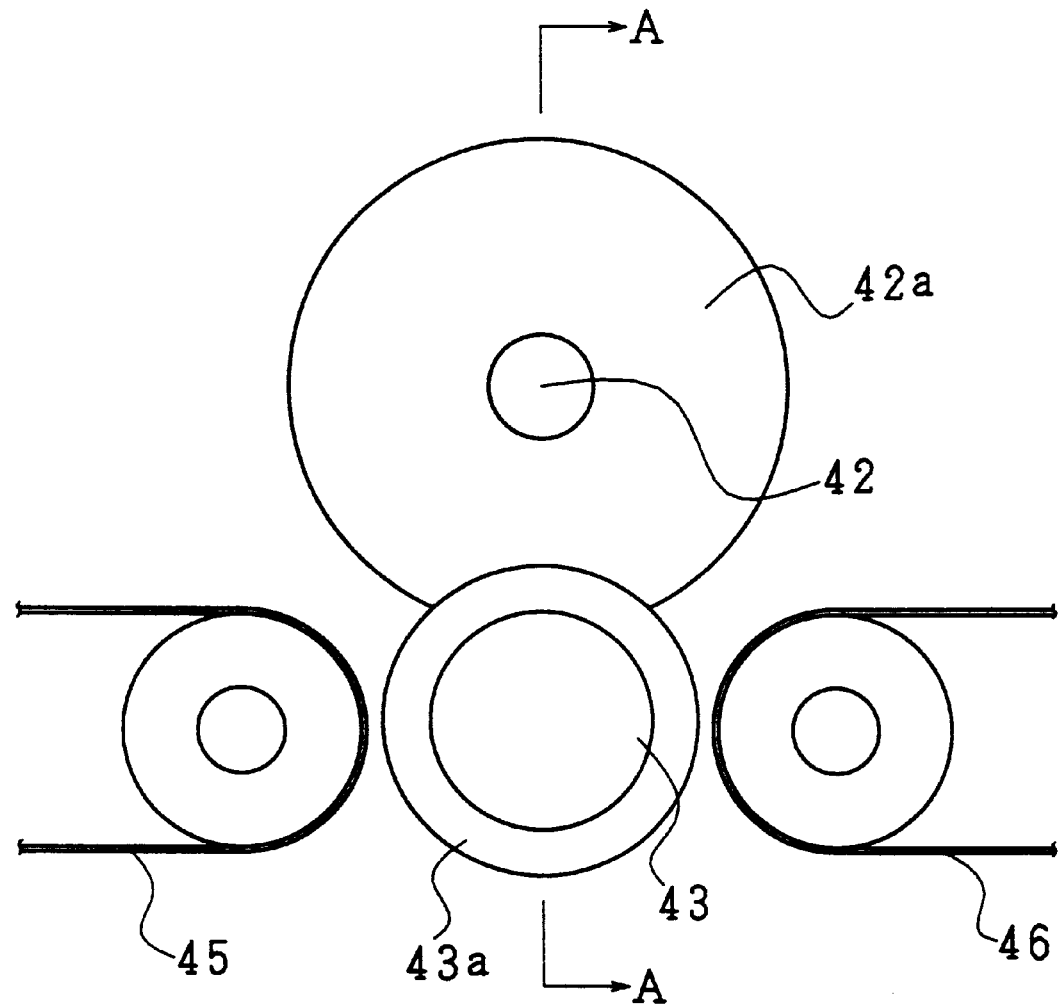
FIG. 6 is a side view of the crushing machine shown in FIG. 5.
Figure 7:
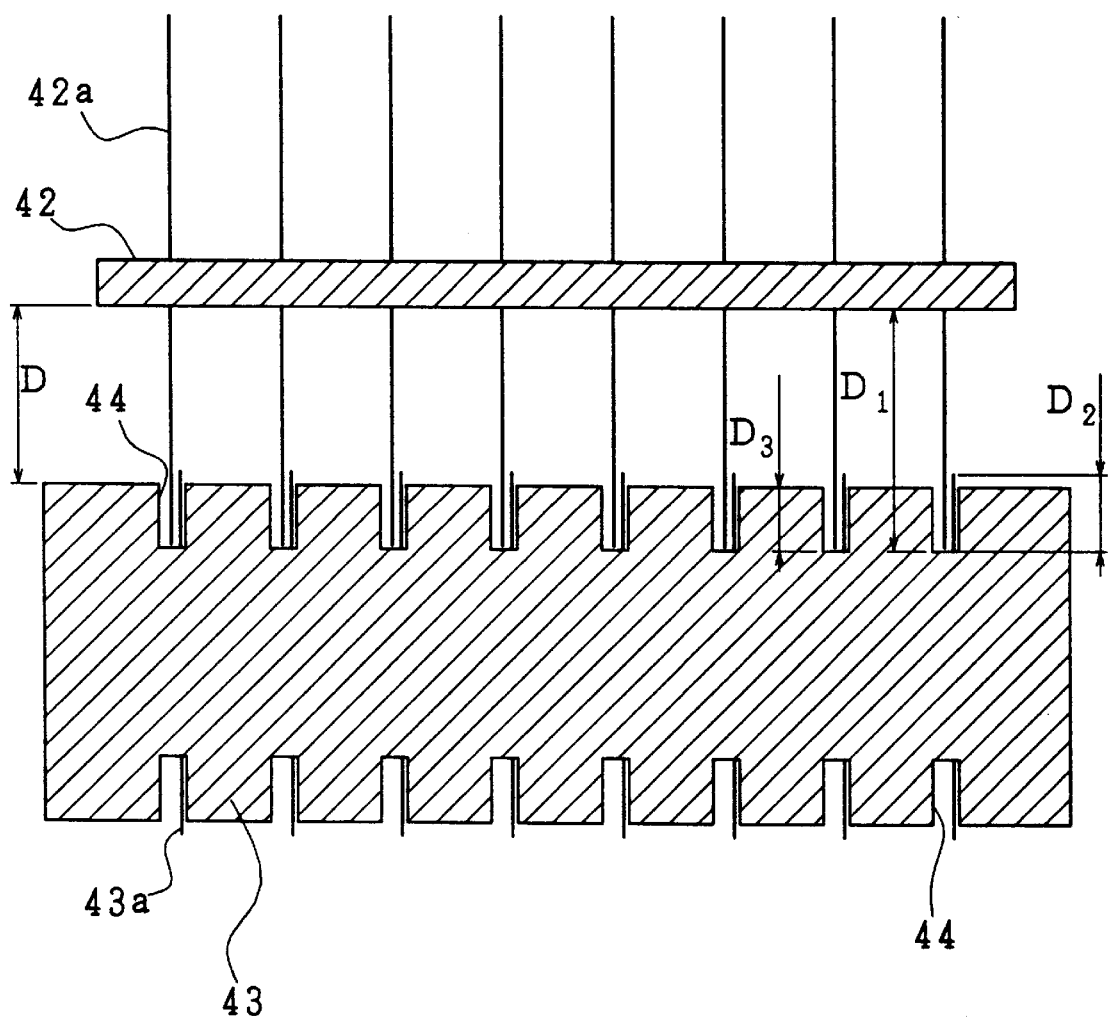
FIG. 7 is a cross section of the crushing machine seen toward a direction shown by arrows A of FIG. 6.
Figure 8:
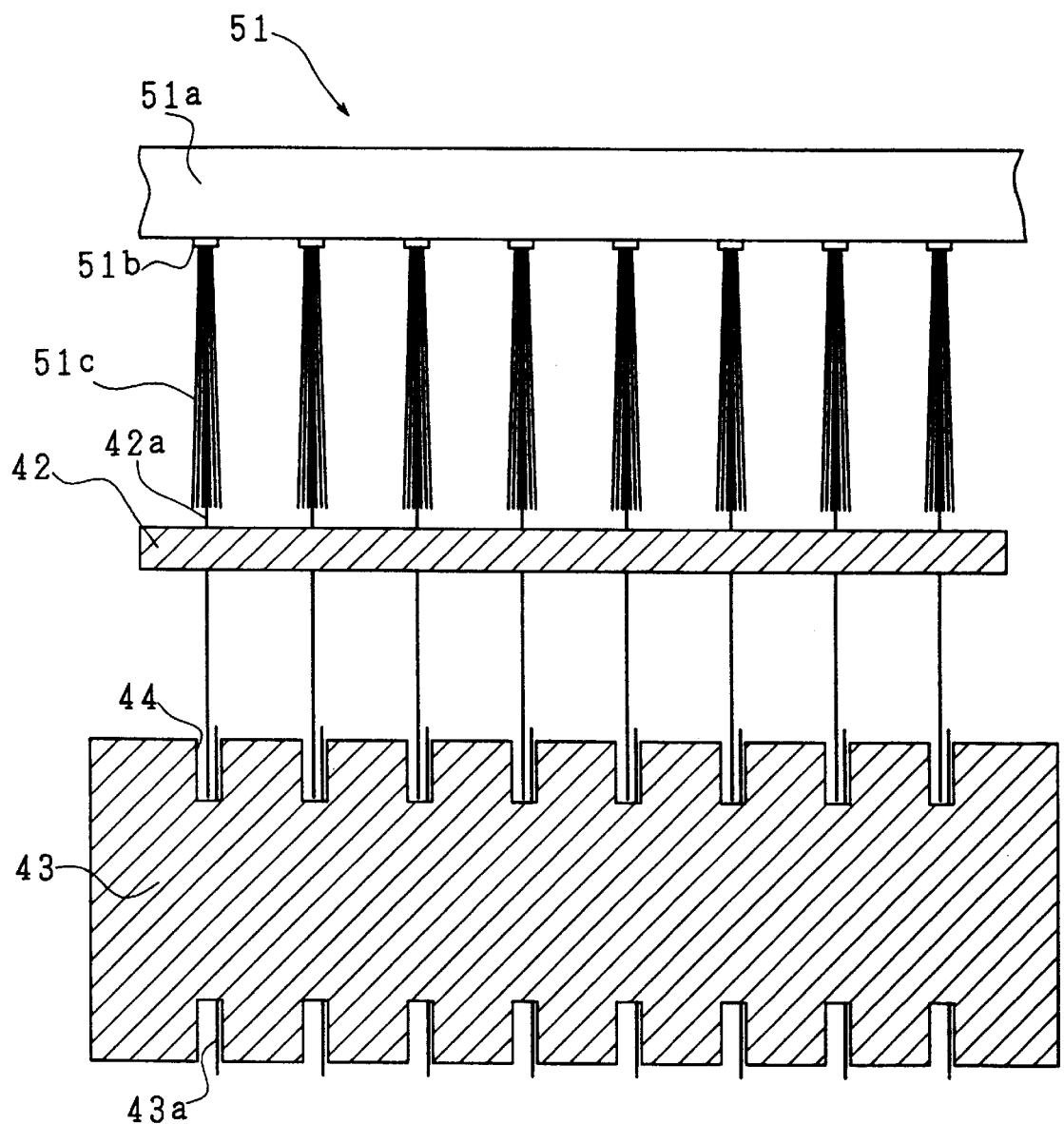
FIG. 8 is a view for explaining a method of applying a lubricant to a rotary blade of the crushing machine shown in FIG. 5.
Figure 9:
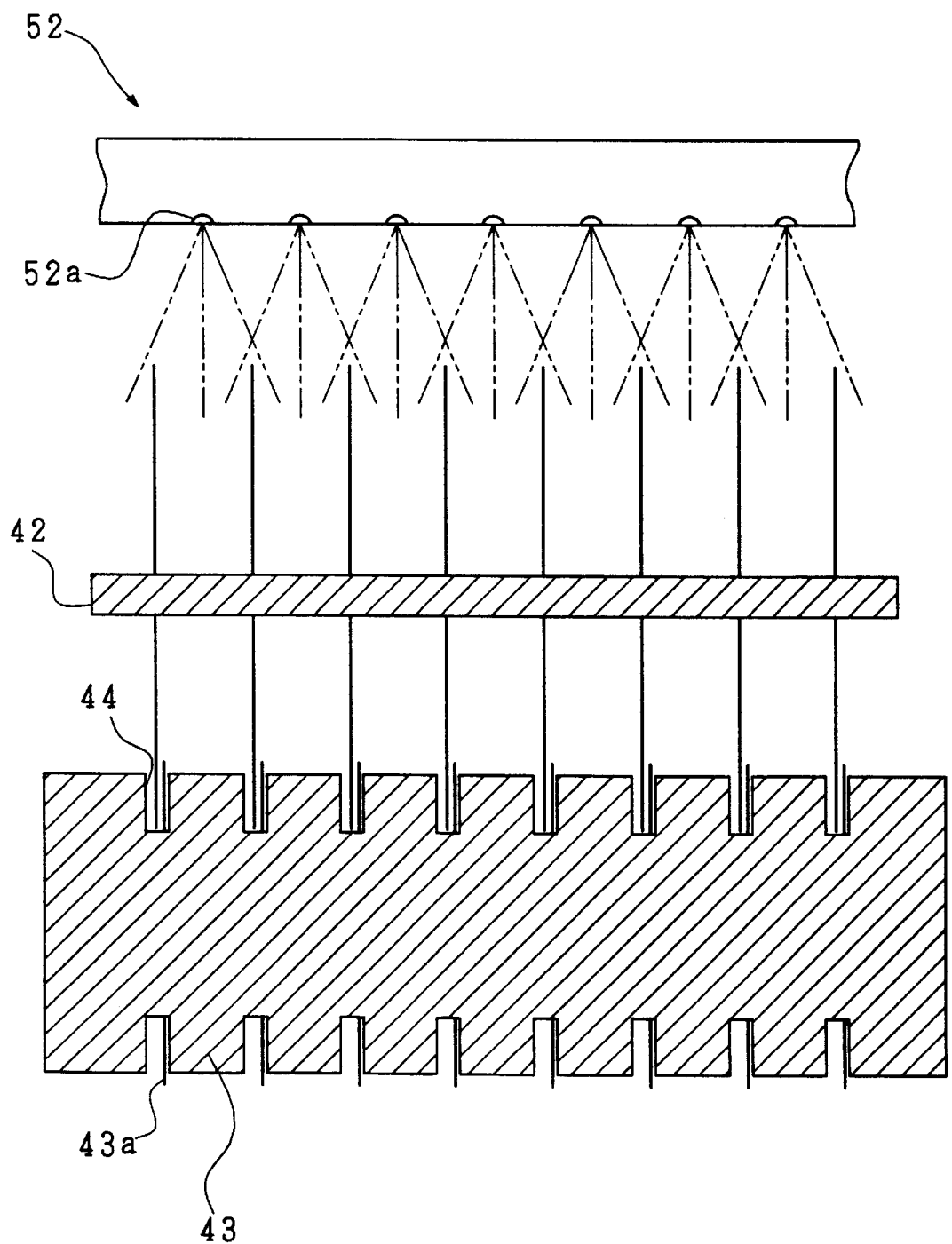
FIG. 9 is a view for explaining a method of spraying a lubricant to the rotary blade of the crushing machine shown in FIG. 5.

Next, the hydrogel (D) was continuously chopped into 15-mm dices using a high-speed slit slicer 41 shown in FIG. 5, and dried at 160° C. for 90 minutes in a hot-air dryer. The high-speed slit slicer 41 has a pair of rotary blades 42a and 43a that are mounted on different shafts and rotate while the rotary blade 42a partly overlapping the rotary blade 43a. The pitch width of each of the rotary blades 42a and 43a of the high-speed slit slicer 41 is 15 mm.

The dried substance resulting from the above-mentioned process was ground by a portable grinder, and sieved with a 850-μm mesh screen. Particles that passed through the screen were dispensed, and a water-absorbent resin (12) of the present invention with an average particle diameter of 250 μm was obtained. The results of measuring the properties of the water-absorbent resin (12) are shown in Table 6.

Example 7

A water-absorbent resin (13) of the present invention was produced by applying a secondary cross-linking treatment to the water-absorbent resin (12) obtained in Example 6 and the vicinity of the surface thereof. Specifically, the water-absorbent resin (13) was obtained by mixing the water-absorbent resin (12) and a treatment liquid for the secondary crosslinking treatment made of an aqueous liquid containing a compound having a plurality of functional groups reactive with a carboxylic group, and heating the resultant mixture at 185° C. for 60 minutes. The composition of the treatment liquid for the secondary crosslinking treatment includes 0.03 part of ethylene glycol diglycidyl ether, 1 part of propylene glycol, 3 parts of deionized water and 2 parts of isopropanol, based on 100 parts of the water-absorbent resin (12). The results of measuring the properties of the water-absorbent resin (13) are shown in Table 6.

Comparative Example 7

The sponge-like hydrogel (D) obtained in Example 6 was finely minced by a meat chopper, and then heated in a 160° C. rotary drum dryer for 90 minutes. The resultant dried substance was ground by a portable grinder, and sieved with a 850-μm mesh screen. Particles that passed through the screen were dispensed, and a water-absorbent resin (14) of the present invention and with an average particle diameter of 220 μm was obtained. The results of measuring the properties of the water-absorbent resin (14) are shown in Table 6.

TABLE 6

|  | Example 6 | Comparative Example 7 | Comparative Example 7 |
|---|---|---|---|
| Water absorbing capacity under no pressure (g/g) | 54.2 | 36.7 | 54.3 |
| Water-soluble component content (%) | 17 | 15 | 20 |
| Absorption rate (second) | 16 | 8 | 40 |

Example 8

An aqueous monomer solution was prepared by mixing 306 parts of an acrylic acid, 3230 parts of 37 percent sodium acrylate, 12 parts of polyethylene glycol diacrylate (an average (EO) added mol number of 8), 0.3 part of polyoxyethylene sorbitan monostearate ("Rheodol TW-S120" available from Kao Corporation), 1330 parts of deionized water, and 20 parts of an aqueous 10 percent sodium persulfate solution.

Next, the aqueous monomer solution and nitrogen were mixed in liquid phase by the Whip Auto Z available from Aikosha Seisakusho K.K., and cells of nitrogen gas were dispersed in the aqueous monomer solution. Then, polymerization was immediately started by adding 100 parts of an aqueous 2 weight percent sulfurous acid solution to the aqueous monomer solution in a state in which the cells were dispersed in the aqueous monomer solution. Subsequently, in the state in which the cells were dispersed in the aqueous monomer solution, stand polymerization was carried out for 1 hour while maintaining the temperature of the aqueous monomer solution within the range of from 25° C. to 95° C. As a result, a sponge-like crosslinked hydrogel polymer containing a large number of cells therein (hereinafter referred to as the "hydrogel (E)") was obtained.

Figure 10:
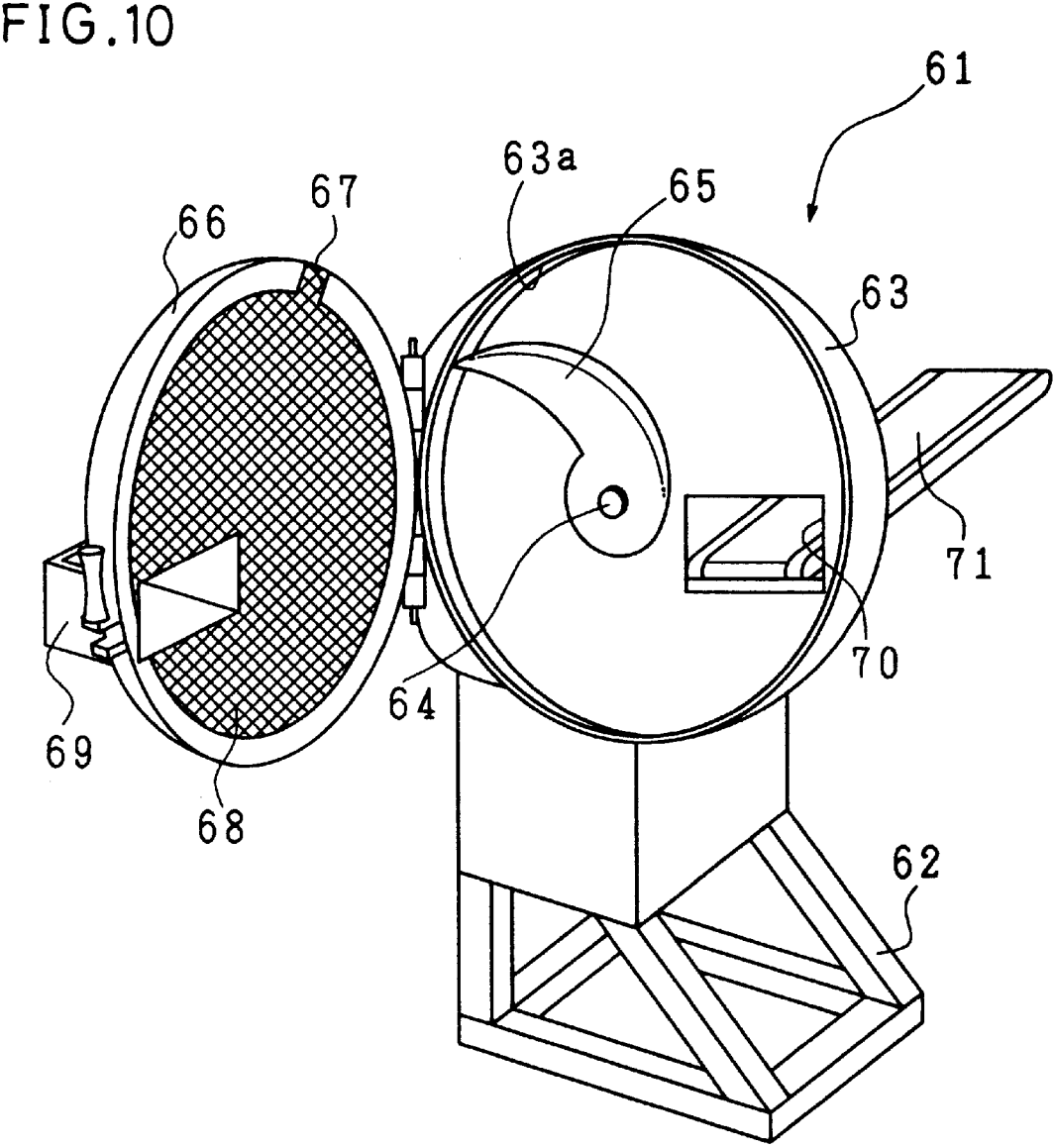
FIG. 10 is a schematic view of still another crushing machine for use in the process for producing water-absorbent resins of the present invention.
Figure 11:
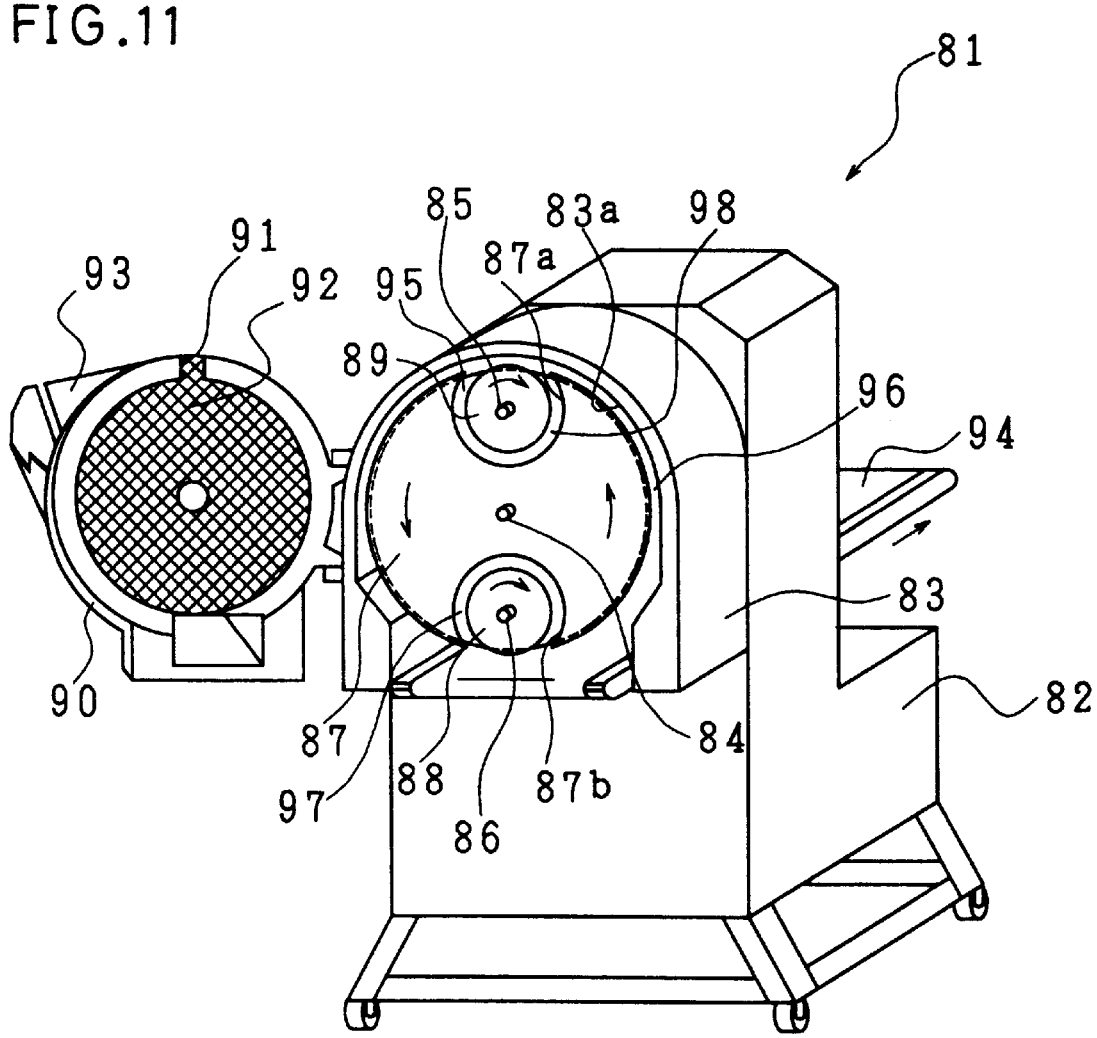
FIG. 11 is a schematic view of yet another crushing machine for use in the process for producing water-absorbent resins of the present invention.

Next, the hydrogel (E) was continuously chopped into 20 mm dices using a slicer 61 shown in FIG. 10 while adding an aqueous 50 percent ethanol solution as a lubricant through the inlet 67 so that the ratio of the aqueous 50 percent ethanol solution to the hydrogel (E) was 1 percent. Furthermore, the chopped crosslinked hydrogel polymer was dried in a circulating type hot-air dryer at 160° C. for 90 minutes.

The dried substance resulting from the above-mentioned process was ground by a portable grinder, and sieved with a 850-$\mu$m mesh screen. Particles that passed through the screen were dispensed, and a water-absorbent resin (15) of the present invention with an average particle diameter of 280 $\mu$m was obtained. The results of measuring the properties of the water-absorbent resin (15) are shown in Table 7.

Example 9

A water-absorbent resin (16) of the present invention was produced by applying a secondary cross-linking treatment to the water-absorbent resin (15) obtained in Example 8 and the vicinity of the surface thereof. Specifically, the water-absorbent resin (16) was obtained by mixing the water-absorbent resin (15) and a treatment liquid for the secondary crosslinking treatment made of an aqueous liquid containing a compound having a plurality of functional groups reactive with a carboxylic group, and heating the resultant mixture at 185° C. for 60 minutes. The composition of the treatment liquid for the secondary crosslinking treatment includes 0.03 part of ethylene glycol diglycidyl ether, 1 part of propylene glycol, 3 parts of deionized water and 2 parts of isopropanol, based on 100 parts of the water-absorbent resin (15). The results of measuring the properties of the water-absorbent resin (16) are shown in Table 7.

TABLE 7

|  | Example 8 | Example 9 |
| --- | --- | --- |
| Water absorbing capacity under no pressure (g/g) | 50.7 | 37.7 |
| Water-soluble component content (%) | 9.5 | 8.5 |
| Absorption rate (second) | 15 | 8 |

Comparative Example 8

The sponge-like hydrogel (E) obtained in Example 8 was subjected to the same cutting process as in Example 8 without adding the aqueous 50 percent ethanol solution as a lubricant. However, the hydrogel (E) was not cut, and adhered to a guillotine-type cutter 65 as a rotary blade of the slicer 61. Consequently, the cutter 65 was stopped to rotate.

Example 10

The hydrogel (A) having cells was obtained by performing the same operation and reaction as in Example 1. After freezing the hydrogel (A) by dipping it in a liquid nitrogen, the freezed hydrogel (A) was crushed with a hammer. The size of the crushed hydrogel was between about 1 and 12 mm. Subsequently, the crushed hydrogel was dried at 160° C. for 1 hour in a circulating type hot-air dryer. Next, the resultant dried substance was ground by a roll mill, and sieved using standard screens according to JIS standards. Particles that passed a 850-$\mu$m mesh screen but did not pass a 150-$\mu$m mesh screen were obtained as a water-absorbent resin (17) of the present invention. The results of measuring the properties of the water-absorbent resin (17) are shown in Table 8. Furthermore, the particle area, the pore area, the pore area ratio, and the retention ratio of the water-absorbent resin (17) were calculated in the same manner as in Example 1. The results are shown Table 9.

Example 11

A water-absorbent resin (18) of the present invention was produced by applying a secondary cross-linking treatment to the water-absorbent resin (17) obtained in Example 10. Specifically, the water-absorbent resin (18) was obtained by mixing 100 parts of the water-absorbent resin (17) and a treatment liquid for the secondary crosslinking treatment, and heating the resultant mixture at 195° C. for 30 minutes. The treatment liquid for the secondary crosslinking treatment was prepared by mixing 0.05 part of ethylene glycol diglycidyl ether, 0.5 part of lactic acid, 0.02 part of polyoxyethylene sorbitan monostearate, 0.75 part of isopropyl alcohol, and 3 parts of water. The results of measuring the properties of the water-absorbent resin (18) are shown in Table 8.

Example 12

By performing the same operation and reaction as in Example 2, the hydrogel (B) having cells was obtained. After freezing the hydrogel (B) by dipping it in a liquid nitrogen, the freezed hydrogel was crushed with a hammer. The size of the crushed hydrogel was between about 2 and 15 mm. Subsequently, the crushed hydrogel was heated at 160° C. for 1 hour in a circulating type hot-air dryer. Next, the resultant dried substance was ground by a roll mill, and sieved using standard screens according to JIS standards. Particles that passed a 850-$\mu$m mesh screen but did not pass a 150-$\mu$m mesh screen were obtained as a water-absorbent resin (18) of the present invention. The results of measuring the properties of the water-absorbent resin (18) are shown in Table 8.

Example 13

A water-absorbent resin (19) of the present invention was produced by further applying a secondary cross-linking treatment to the water-absorbent resin (18) obtained in Example 12. Specifically, the water-absorbent resin (19) was obtained by mixing 100 parts of the water-absorbent resin (18) and a treatment liquid for the secondary crosslinking treatment, and heating the resultant mixture at 195° C. for 30 minutes. The treatment liquid for the secondary crosslinking treatment was prepared by mixing 1 part of glycerin, 3 parts of water, and 1.75 parts of ethyl alcohol. The results of measuring the properties of the water-absorbent resin (19) are shown in Table 8.

TABLE 8

| | Examples | | | |
|---|---|---|---|---|
| | 10 | 11 | 12 | 13 |
| Water absorbing capacity under no pressure (g/g) | 50.3 | 42.0 | 48.9 | 41.5 |
| Water-soluble component content (%) | 7.2 | 7.3 | 6.1 | 6.4 |
| Residual monomer content (ppm) | 200 | 185 | 285 | 280 |
| Absorption rate (second) | 34 | 37 | 40 | 38 |
| Water absorbing capacity under applied pressure (g/g) | 12 | 33 | 9 | 30 |

TABLE 9

Example 10

| | |
|---|---|
| Average particle area ($\mu m^2$): 166054 | Number of pores: 136 (piece) |
| Number of particles (piece): 42 | Ratio of pore area (%): 26 |
| Average pore area ($\mu m$): 13478 | Cell retention ratio (%): 59 |

It is clear from the results of Example 10 and Comparative Examples 1 and 2 that it is possible to produce water-absorbent resins having higher water absorbing capacity and a less amount of soluble component compared to that produced by a conventional process, by adopting the method of crushing the resultant hydrogel after freezing it as the crushing method. This is also clear from the results of Example 13 and Comparative Examples 3 and 4.

As described in Examples 11 and 13, by applying the secondary crosslinking treatment to the vicinity of the surface of the resultant water-absorbent resin, it is possible to further increase the water absorbing capacity under applied pressure while maintaining a high water absorbing capacity and small amount of soluble component.

Moreover, it is clear from the results of Examples 1 and 10 and Comparative Example 1 that the pore retention ratio at the particle surface of a water-absorbent resin produced by the process of the present invention is higher than that obtained by using a conventional crushing technique. More specifically, by freezing the hydrogel obtained by solution polymerization before crushing, it is possible to restrain the cells in the crosslinked hydrogel polymer from being squashed during crushing of the crosslinked hydrogel polymer. Consequently, water-absorbent resins retaining 20 or more percent cells therein can be produced in a stable and simple manner.

Furthermore, it is clear from the results of Example 1 and Comparative Example 2 that the process of the present invention requires a shorter time to crush the crosslinked hydrogel polymer compared to a process using scissors.

INDUSTRIAL APPLICABILITY

According to the process for producing a water-absorbent resin of the present invention, it is possible to provide particulate water-absorbent resins with excellent absorption properties, such as water absorbing capacity, absorption rate and water absorbing capacity under applied pressure, and reduced water-soluble component content and residual monomer content, by crushing a crosslinked hydrogel polymer without kneading it, for example, crushing the crosslinked hydrogel polymer so as to restrain reduction in the number of cells possessed by the crosslinked hydrogel polymer.

Moreover, according to the process for producing a water-absorbent resin of the present invention, since the crosslinked hydrogel polymer can be crushed efficiently and continuously, it is possible to improve the crushing efficiency and increase the productivity compared to a conventional crushing technique using scissors. Consequently, it is possible to industrially and simply mass-produce water-absorbent resins with excellent absorption properties, reduced water-soluble component content and residual monomer content.

Water-absorbent resins produced by the process of the present invention have excellent absorption properties and are suitably used in various applications, for example: sanitary materials (body exudates absorbent articles) such as paper diapers, sanitary napkins, incontinence pads, wound protecting material and wound healing material; absorbent articles for absorbing urine of pets; materials for construction and building, such as water retentive material for building material and soil, waterproof material, packing material, and gel water bag; materials for food, such as drip absorbing material, freshness retentive material, and heat insulating material; various industrial articles, such as oil and water separating material, dew condensation preventing material, and coagulant; and agricultural and horticultural articles, such as water retentive material for plant and soil.

We claim:

1. A process for producing a water-absorbent resin by crushing and drying a crosslinked hydrogel polymer having cells, comprising the step of continuously crushing said crosslinked hydrogel polymer so as to restrain reduction in an amount of said cells contained in said crosslinked hydrogel polymer.

2. The process for producing a water-absorbent resin according to claim 1, wherein the step of crushing said crosslinked hydrogel polymer includes shearing the polymer with a rotary blade, and with a fixed blade disposed to face said rotary blade.

3. The process for producing a water-absorbent resin according to claim 2, wherein the step of crushing said crosslinked hydrogel polymer includes extruding the polymer between said rotary blade and said fixed blade by a centrifugal force applied by said rotary blade.

4. The process for producing a water-absorbent resin according to claim 2, further comprising the step of collecting the crosslinked hydrogel polymer extruded from a rotation area of said rotary blade due to a centrifugal force applied by said rotary blade and crushed into a predetermined size, and crushing again the crosslinked hydrogel polymer that was extruded and crushed into a size larger than the predetermined size by shearing said crosslinked hydrogel polymer with said rotary blade and fixed blade.

5. The process for producing a water-absorbent resin according to claim 4, wherein the step of collecting the crushed crosslinked hydrogel polymer includes extruding the polymer through holes with a predetermined diameter in a screen mounted along and outside of an arc drawn by a rotation of said rotary blade.

6. The process for producing a water-absorbent resin according to claim 5, wherein the step of collecting the crushed crosslinked hydrogel polymer includes drawing said crushed crosslinked hydrogel polymer from outside of said screen.

7. The process for producing a water-absorbent resin according to claim 1, wherein the crushed crosslinked hydrogel polymer retains 20 or more percent of said cells contained before crushing.

8. The process for producing a water-absorbent resin according to claim 1, wherein said crosslinked hydrogel polymer is obtained by polymerizing an ethylenically unsaturated monomer and a crosslinking agent in a state in which cells of an inert gas are dispersed in an aqueous solution containing the ethylenically unsaturated monomer and the crosslinking agent.

9. The process for producing a water-absorbent resin according to claim 1, further comprising the step of applying a secondary crosslinking treatment to a vicinity of a surface of a particulate material obtained by crushing said crosslinked hydrogel polymer.

10. The process for producing a water-absorbent resin according to claim 1, wherein the step of crushing said crosslinked hydrogel polymer includes cutting the polymer with a cutter having a plurality of pairs of disk rotary blades provided at predetermined intervals, said disk rotary blades in each pair being mounted on different shafts and rotating while their respective disk surfaces overlap each other at least partially, said crosslinked hydrogel polymer being supplied into a space between said disk rotary blades.

11. The process for producing a water-absorbent resin according to claim 10, wherein at least one of said shafts of said cutter includes a slit to receive an end of the facing blade.

12. The process for producing a water-absorbent resin according to claim 1, wherein the step of crushing said crosslinked hydrogel polymer includes cutting the polymer with a cutter having a lubricated rotary blade, wherein said blade has a curved cutting face.

13. The process for producing a water-absorbent resin according to claim 12, wherein cutting said crosslinked hydrogel polymer is accomplished while said rotary blade has a lubricant adhering to the blade.

14. The process for producing a water-absorbent resin according to claim 1, wherein the step of crushing said crosslinked hydrogel polymer is accomplished after freezing said crosslinked hydrogel polymer.

15. The process for producing a water-absorbent resin according to claim 1, wherein said crosslinked hydrogel polymer is obtained by aqueous solution polymerization of an acrylic acid or an alkaline metal salt of acrylic acid under the presence of a crosslinking agent so as to contain cells.

16. A process for producing a water-absorbent resin by grinding and drying a crosslinked hydrogel continuous polymer, comprising the step of crushing said crosslinked hydrogel polymer by shearing the continuous polymer with a rotary blade and a fixed blade disposed to face said rotary blade.

17. A process for producing a water-absorbent resin by grinding and drying a crosslinked hydrogel polymer, comprising the step of crushing said crosslinked hydrogel polymer by cutting the polymer with a cutter having a plurality of pairs of disk rotary blades provided at predetermined intervals, said disk rotary blades in each pair being mounted on different shafts and rotating while their respective disk surfaces overlap each other at least partially, said crosslinked hydrogel polymer being supplied into a space between said disk rotary blades.

18. A process for producing a water-absorbent resin by grinding and drying a crosslinked hydrogel polymer, comprising the step of crushing said crosslinked hydrogel polymer by cutting the polymer with a cutter having a lubricated rotary blade, and said blade having a curved cutting face.

19. A process for producing a water-absorbent resin by grinding and drying a crosslinked hydrogel continuous polymer, comprising the step of crushing said crosslinked hydrogel polymer after freezing said crosslinked hydrogel continues polymer.

20. The process for producing a water-absorbent resin according to claim 2, wherein said crosslinked hydrogel polymer is crushed by a rotary crusher which has said rotary blade and fixed blade, wherein the rotary crusher has a residual time of between 1 second and 3 minutes.

21. The process for producing a water-absorbent resin according to claim 12, wherein said lubricant is at least one kind of lubricant selected from water, a hydrophilic organic solvent, and a surfactant aqueous solution.

22. The process for producing a water-absorbent resin according to claim 12, wherein said cutter has a plurality of pairs of disk rotary blades provided at predetermined intervals, said disk rotary blades in each pair being mounted on different shafts and rotating while their respective disk surfaces overlapping each other at least partially, and said cutter crushes said crosslinked hydrogel polymer by cutting said crosslinked hydrogel polymer supplied within a space between said disk rotary blades.

23. The process for producing a water-absorbent resin according to claim 16, wherein said crosslinked hydrogel polymer is crushed by a rotary crusher which has said rotary blade and fixed blade, and wherein said rotary crusher has a manner that a residual time is between 1 second and 3 minutes.

24. The process for producing a water-absorbent resin according to claim 18, wherein said lubricant is at least one kind of lubricant selected from water, a hydrophilic organic solvent, and a surfactant aqueous solution.

25. The process for producing a water-absorbent resin according to claim 12, wherein said cutter has a plurality of pairs of disk rotary blades provided at predetermined intervals, said disk rotary blades in each pair being mounted on different shafts and rotating while respective disk surfaces on said blades overlap at least partially, and said cutter crushes said crosslinked hydrogel polymer by cutting said crosslinked hydrogel polymer supplied within a space between said disk rotary blades.

* * * * *